United States Patent
Onodera

(10) Patent No.: US 7,023,792 B1
(45) Date of Patent: Apr. 4, 2006

(54) TRANSMITTER FOR SPREAD-SPECTRUM COMMUNICATION

(75) Inventor: Takashi Onodera, Yotsukaido (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/958,340

(22) PCT Filed: Mar. 21, 2000

(86) PCT No.: PCT/JP00/01726

§ 371 (c)(1),
(2), (4) Date: Oct. 9, 2001

(87) PCT Pub. No.: WO00/60788

PCT Pub. Date: Oct. 12, 2000

(30) Foreign Application Priority Data

Apr. 6, 1999 (JP) ................................. 11/099436

(51) Int. Cl.
*H04J 11/00* (2006.01)
(52) U.S. Cl. ....................... 370/203; 375/146
(58) Field of Classification Search ................ 370/203, 370/204, 208–211; 375/143–146
See application file for complete search history.

(56) References Cited

U.S. PATENT DOCUMENTS

| | | | | |
|---|---|---|---|---|
| 5,423,001 A | * | 6/1995 | Ueda | 329/372 |
| 5,721,734 A | * | 2/1998 | Ishida | 370/335 |
| 5,768,306 A | * | 6/1998 | Sawahashi et al. | 375/150 |
| 5,960,028 A | | 9/1999 | Okamoto et al. | |
| 6,163,566 A | * | 12/2000 | Shiino | 375/143 |
| 6,496,474 B1 | * | 12/2002 | Nagatani et al. | 370/208 |

FOREIGN PATENT DOCUMENTS

| | | |
|---|---|---|
| EP | 0 428 046 | 5/1991 |
| EP | 0 758 823 | 2/1997 |
| JP | 9-23170 | 1/1997 |
| JP | 9-55714 | 2/1997 |
| JP | 9-93162 | 4/1997 |
| JP | 2803237 | 7/1998 |
| JP | 11-145932 | 5/1999 |
| JP | 11-150523 | 6/1999 |

* cited by examiner

*Primary Examiner*—John Pezzlo
*Assistant Examiner*—Dmitry Levitan
(74) *Attorney, Agent, or Firm*—Nixon & Vanderhye P.C.

(57) ABSTRACT

A multiplexing timing signal generator (1) generates a multiplexing timing signal activated for each interval corresponding to a number of chips delayed in multiplexing between data to be transmitted. Driven by the multiplexing timing being active, each operation unit multiplies identical data to be transmitted by a chip of a spreading code sequence and each chip corresponding to a spread spectrum result is added in an operation unit 3(1) to an offset value and in operation units 3(2)–3(N) to their respective, immediately preceding registers 2(1)–2(N−1) values and output as signals for subsequent registers 2(1)–2(N). Thus a multiplexing process is effected. Data to be transmitted has its spectrum spread by a spreading code sequence $C_1$–$C_N$ and a result of multiplexing the same in response to a multiplexing timing signal is output from a register(2(N)) by 1 chip at a time in synchronization with a clock signal.

15 Claims, 18 Drawing Sheets

| CONVENTIONAL EXAMPLE | PRESENT INVENTION | AFTER AMPLITUDE CONVERSION |
|---|---|---|
| -5 | 0(+OFFSET) | -85 |
| -3 | 1(+OFFSET) | -51 |
| -1 | 2(+OFFSET) | -17 |
| 1 | 3(+OFFSET) | 17 |
| 3 | 4(+OFFSET) | 51 |
| 5 | 5(+OFFSET) | 85 | ns
TRANSMITTER FOR SPREAD-SPECTRUM COMMUNICATION

TECHNICAL FIELD

The present invention relates generally to spread spectrum communication transmitters and particularly to a spectrum spreading and multiplexing circuit provided in a spread spectrum communications system at a transmitting modulator to provide a spectrum spreading and multiplexing process by applying a single spreading code sequence to all data to be transmitted to provide spread spectrum data which are in turn delayed by different times, respectively, and a multitude of such delayed, spread spectrum data are added together for each chip corresponding to a minimal unit of the spreading process, to multiplex the data to allow rapid communication.

BACKGROUND ART

A spread spectrum communication system is represented by the following equation:

$$s(t) = \sum_{i=1}^{M} (a_i(t-\tau_i) \cdot c(t-\tau_i))$$

wherein
- s (t): spread-spectrum and multiplexed signal to be transmitted,
- $a_i$ (t): data to be transmitted having been serial-parallel converted by a number of signals in multiplexing and not yet have the spectrum spread,
- c (t): spreading code sequence (having a period of 1/spreading code sequence length relative to the period in variation of $a_i$ (t),
- M: number of signals in multiplexing, and
- $\tau_i$: delay time between data to be transmitted.

A first conventional example of such a spread spectrum communication systems is disclosed in Japanese Patent Laying-Open No. 9-55714 to implement a rapid communication by multiplexing data while preventing communications characteristics from deteriorating. This system serial-parallel converts data to be transmitted and applies a single spreading code sequence to a plurality of such data to provide spread-spectrum data and the results of the spreading are delayed by different delay times, respectively, and then combined and thus multiplexed.

FIG. 23 is a block diagram of a spreading and multiplexing circuit on a transmitting side in the spread spectrum communication systems of the first conventional example.

This spreading and multiplexing circuit is configured by a serial-parallel converter 16, a spreading code sequence generator 17, a multiplier 18, a delay unit 19, and a summation unit 20. Serial-parallel converter 16 serial-parallel converts data to be transmitted. Spreading code sequence generator 17 generates a spreading code sequence. Multiplier 18 receives from serial-parallel converter 16 a plurality of parallel data to be transmitted and multiplies the parallel data by a single, spreading code sequence generated by spreading code sequence generator 17, to provide spread spectrum data. Ddelay unit 19 delays a result of the multiplication of multiplier 18 by a respective, different delay time. Summation unit 20 adds all such results of the multiplication together to multiplex the same. Thus a plurality of data to be transmitted can have the spectrum spread by a single spreading code sequence and the results of the spreading can be delayed by different delay times, respectively, and then configured and thus be multiplexed.

Furthermore, a second conventional example is disclosed in Japanese Patent No. 2803237. It is a modulator modulating a plurality of data to be transmitted, each with a spreading code sequence corresponding to a single pseudo noise (or a spreading code sequence) offset (shifted) in phase, respectively, and thus providing spread spectrum data which are in turn matched in phase and thus added together for each chip and thus multiplexed.

FIG. 24 is a block diagram of a spreading and multiplexing circuit in a data communication transmitter of the second conventional example. In FIG. 24, the spreading and multiplexing circuit is configured by a sequence code generator 40, operation units 41(1) to 41(L), pipeline registers 42(1) to 42(L), and a delay shift register 43. Sequence code generator 40 generates a spreading code sequence, one chip at a time, in synchronization with a clock signal. Operation units 41(1) to 41(L) share a spreading code sequence generated by sequence code generator 40 and also receive L data to be transmitted 1-L, respectively. The initial-stage operation unit 41(1) receives "0" and the remaining operation units 41(2) to 41(L) each receive an output of the immediately preceding pipeline register. If data to be transmitted is "1", the value of the spreading code sequence (a conversion "−1" for "0") is added to "0"/a value output from the immediately preceding pipeline register. If data to be transmitted is "0", then "0"/a value output from the immediately preceding pipeline register is output. Pipeline registers 42(1) to 42(L) receive the outputs of operation units 41(1) to 41(L), respectively, and shift in response to a clock signal to shift phase. Delay shift register 43 delays a spreading code sequence to generate a reference sequence signal.

In the spreading and multiplexing circuit of the first conventional example, however, the number of the multipliers and that of the delay units need to match a maximal number of signals in multiplexing, and furthermore the number of multipliers used and that of delay units used need to vary when that of signals in multiplexing varies. In the system disclosed in Japanese Patent Laying-Open No. 9-55714, a timing of multiplexing can be changed in operation and a number of signals in multiplexing can be switched to another implement multi-rate allowing a plurality of transmission rates to be selected, although the delay unit is required to provide a delay time varying dynamically.

Thus the spreading and multiplexing circuit of the first conventional example disadvantageously has a complicated circuit configuration and is controlled in a complicated manner. Furthermore in the spreading and multiplexing circuit of the first conventional example there exists a chip devoid of multiplexing by a predetermined number when it is powered on at the time when it starts operation from the initial status, such as when a transmission starts, and when a number of signals in multiplexing is switched to another during a transmission, for example at a boundary where the number is switched between a header and data. This contributes to establishment of correlation synchronization attributed to an inappropriate timing and erroneous detection of a correlation value required for a post-demodulation data decision from a result of an operation of a correlation value of a spread-spectrum waveform received by a receiver (a waveform sampled in response to a clock several times a chip rate) and a spreading code sequence. In other words, there is a high possibility that there occurs a capture of demodulation data position in a received signal at an inappropriate timing, which can introduce data error in demodulation. Disadvantageously the spreading and multiplexing circuit of the first conventional example can hardly address this deficiency.

The spreading and multiplexing circuit of the second conventional example cannot change the number of signals in multiplexing or the amount of shifting a phase of a spreading code sequence for its circuit configuration. It only allows communications with a designed, series of numbers of signals in multiplexing and a designed, series of amounts of phase-shifting and it cannot implement multi-rate.

Furthermore in the spreading and multiplexing circuit of the second conventional example if the number of data desired to be successively transmitted is larger than that of operation units and that of pipeline registers, each data to be transmitted needs to be input to an operation unit at a timing delayed to correspond to an amount of shifting of a phase of a spreading code sequence corresponding thereto. This requires a circuit serial-parallel converting the data to be transmitted, and delaying a timing of outputting the parallel data, by an amount of phase-shifting, and accordingly increases the scale of the circuit of interest. Furthermore, it is difficult to provide this serial-parallel conversion and delay circuit to accommodate changes in the number of signals in multiplexing and that of amounts of phase-shifting, which is another factor preventing the implementation of multi-rate.

DISCLOSURE OF THE INVENTION

Therefore a main object of the present invention is to provide a spread spectrum communication transmitter having a simple circuit configuration and simply controlled while accommodating switching a number of signals in multiplexing to another in multi-rate communication using a plurality of numbers of signals in multiplexing.

Generally the present invention provides a spread spectrum communication transmitter applying a single spreading code sequence to all data to be transmitted, to provide spread spectrum data, delaying each of the spread spectrum data by a different time to provide delayed, spread spectrum data, and adding the delayed, spread spectrum data together for each chip corresponding to a minimal spreading unit, to provide multiplex data, including: a multiplexing timing signal generation circuit generating a multiplexing timing signal activated for each interval corresponding to a number of chips delayed in multiplexing between data to be transmitted; a register each corresponding to a chip of the spreading code sequence and taking in input data holding a number of chips each corresponding to a result of spectrum-spreading and thus multiplexing at least one data to be transmitted, the number corresponding to the length of the spreading code sequence, the register taking in the input data in response to a clock signal equal to a chip rate corresponding to a rate applied to transmit each spread spectrum chip; and an operation circuit each including an operation unit paired with the register and corresponding to a chip of the spreading code sequence, receiving a value of a chip of the spreading code sequence corresponding to the operation unit and identical data to be transmitted, any subsequent one of the operation unit each receiving a value of an output of an immediately preceding register and simultaneously obtaining a chip corresponding to a result of spreading a spectrum of data to be transmitted, with a corresponding chip of the spreading code sequence, when the multiplexing timing signal output from the multiplexing timing signal generation circuit is active, an initial one of the operation unit imputing to the paired register the result of spreading, when the multiplexing timing signal is inactive the initial operation unit inputting a numerical value of zero to the paired register and any other operation unit inputting the value of the immediately preceding register to the paired register.

Thus in the present invention a register holding a result of a spectrum-spreading and multiplexing process can be configured simply in one system of a single configuration regardless of the number of signals in multiplexing and the pattern of the timing of the multiplexing, and furthermore a spreading and multiplexing operation can be effected by an operation unit rendered common. Thus the circuit configuration can be simplified. Furthermore, a multiplexing timing signal can be altered to correspond to a desired number of signals in multiplexing and a desired pattern of a timing of the multiplexing, to control the multiplexing and a single spreading and multiplexing circuit can be sufficient to provide multi-rate communication using a plurality of signals in multiplexing and a timing of the multiplexing. The present invention can also facilitate switching a number of signals in multiplexing to another and a timing of the multiplexing to another in a transmission operation. This multiplexing timing signal can readily be altered by the multiplexing timing signal generation circuit driven by a result of decoding an output of a counter and the circuit can readily be controlled in switching the multiplexing.

Furthermore at one or both of a timing of starting a transmission operation and that of switching the multiplexing an initial-value setting circuit can be used to set an initial value for each register to prevent erroneous detection of a correlation point and establishment of correlation synchronization at an inappropriate point that are attributed to the existence of a chip devoid of a predetermined number of signals in multiplexing when the transmission operation starts and the multiplexing switches.

The present invention in another aspect provides a spread spectrum communication transmitter applying a single spreading code sequence to all data to be transmitted, to provide spread spectrum data, delaying each of the spread spectrum data by a different time to provide delayed, spread spectrum data, and adding the delayed, spread spectrum data together for each chip corresponding to a minimal spreading unit, to provide multiplex data, including: a multiplexing timing signal generation circuit generating a multiplexing timing signal activated for each interval corresponding to a number of chips delayed in multiplexing between data to be transmitted; a register each corresponding to a chip of the spreading code sequence and taking in input data holding a number of chips each corresponding to a result of spectrum-spreading and thus multiplexing at least one data to be transmitted, the number corresponding to the length of the spreading code sequence, the register taking in the input data in response to a clock signal equal to a chip rate corresponding to a rate applied to transmit each spread spectrum chip; and an operation circuit each including an operation unit paired with the register and corresponding to a chip of the spreading code sequence, receiving a value of a chip of the spreading code sequence corresponding to the operation unit and identical data to be transmitted, any subsequent one of the operation unit each receiving a value of an output of an immediately preceding register, an initial one of the operation unit receiving a predetermined offset value, the operation unit simultaneously obtaining a chip corresponding to a result of spreading a spectrum of data to be transmitted, with a corresponding chip of the spreading code sequence, when the multiplexing timing signal output from the multiplexing timing signal generation circuit is active, the initial operation unit imputing to the paired register the result of spreading plus the offset value, when the multiplexing timing signal is inactive the initial operation unit inputting the offset value to the paired register and any other operation unit inputting the value of the immediately preceding register to the paired register.

Preferably the operation circuit includes: an addition circuit adding one of positive and negative constants arbitrarily determined and shared by each chip, to the offset value for the initial operation unit and to the value of the immediately preceding register for any other operation unit; a first logic operation circuit outputting a first logic signal serving as a result of a multiplication of an identical sign based on a fact that data to be transmitted is equal in value to a corresponding spreading code sequence, and outputting a second logic signal serving as a result of a multiplication of a different sign based on a fact that data to be transmitted is different in value from a corresponding spreading code sequence; a second logic operation circuit deriving an output of the first logic operation circuit when the multiplexing timing signal is active, and outputting the second logic signal when the multiplexing timing signal is inactive; and a select circuit selecting an output of the addition circuit when the second logic operation circuit outputs a first logic, and selecting the offset value for the initial operation unit and the output of the immediately preceding register for any other operation unit when the second logic operation circuit outputs a second logic.

Still more preferably, the constant is a first logic, and the operation circuit includes: a first logic operation circuit outputting a first logic signal serving as a result of a multiplication of an identical sign based on a fact that data to be transmitted is equal in value to a corresponding spreading code sequence, and outputting a second logic signal serving as a result of a multiplication of a different sign based on a fact that data to be transmitted is different in value from a corresponding spreading code sequence; a second logic operation circuit deriving an output of the first logic operation circuit when the multiplexing timing signal is active, and outputting the second logic signal when the multiplexing timing signal is inactive; and an addition circuit outputting the offset value for the initial operation unit and adding an output of the second logic operation circuit to the value of the immediately preceding register for any other operation unit.

More preferably the operation circuit includes: a positive operation unit having an initial operation unit and a subsequent operation unit, for a corresponding spreading code sequence chip having a first logic when the multiplexing timing signal is active at a timing of a clock the initial operation unit adding the offset value and data to be transmitted together and the subsequent operation unit adding a value of a corresponding, immediately preceding register and data to be transmitted together and when the multiplexing timing signal is inactive at the timing of the clock the initial operation unit inputting the offset value to a corresponding register and the subsequent operation unit inputting the value of the immediately preceding register to a corresponding register; and a negative operation unit having an initial operation unit and a subsequent operation unit, for a corresponding spreading code sequence chip of a second logic when the multiplexing timing signal is active at a timing of a clock the initial operation unit adding the offset value and data to be transmitted together and the subsequent operation unit adding a value of an immediately preceding register and an inverted version of the data to be transmitted together and when the multiplexing timing signal is inactive at the timing of the clock the initial operation unit outputting the offset value and the subsequent operation unit outputting the value of the immediately preceding register.

Still more preferably the positive operation unit has: an adder adding together the offset value and one of positive and negative constants arbitrarily determined and shared by each chip, for the initial, positive operation unit; a logic operation unit driven by the multiplexing timing signal being active, to output the data to be transmitted, and driven by the multiplexing timing signal being inactive, to output a second logic signal; and a selector driven by an output of the logic operation unit of a first logic to derive an output of the adder, and driven by the output of the logic operation unit of a second logic to select one of the offset value and the output of the immediately preceding register.

More preferably the negative operation unit has: an adder adding together the offset value and one of positive and negative constants arbitrarily determined and shared by each chip, for the initial, negative operation unit; a sign inverter inverting a sign of the data to be transmitted; a logic operation circuit deriving an output of the sign inverter when the multiplexing timing signal is active, and outputting a second logic value when the multiplexing timing signal is inactive; and a selector driven by an output of the logic operation circuit of a first logic value to select an output of the adder and driven by the output of the logic operation circuit of a second logic value to select one of the offset value and the output of the register.

More preferably the constant has a first logic value, the adder increments the constant by one, and the positive operation unit has: a logic operation unit outputting data to be transmitted when the multiplexing timing signal is active, and outputting a second logic value when the multiplexing timing signal is inactive; and an adder adding an output of the logic operation unit to the offset value for the initial operation unit. More preferably the constant has a first logic value, and the negative operation unit has: a sign inversion circuit inverting a sign of the data to be transmitted; a logic operation unit deriving an output of the sign inversion circuit when the multiplexing timing signal is active, and outputting a second logic value when the multiplexing timing signal is inactive; and an adder adding an output of the logic operation unit to the offset value for the initial operation unit and adding an output of the logic operation unit to a value of a corresponding, immediately preceding register for any other operation unit.

Still more preferably the transmitter further includes an initial-value setting circuit setting an initial value in each resister at at least one of a timing of starting a transmission operation and a timing of multiplexing-switching, the initial value being determined for each register from a location of a corresponding chip of a spreading code sequence and a number of signals in multiplexing and a pattern of a timing of the multiplexing.

More preferably the initial-value setting circuit receives at least one of a timing of starting the transmission operation and that of multiplexing-switching, and an initialization signal indicative of information of a number of signals in multiplexing and a pattern of the multiplexing, an initial operation unit receiving the offset value and any other operation unit adding together a value of an immediately preceding register and an initial value predetermined for a location of each chip of the spreading code sequence at a timing indicated by the initialization signal, to allow the initial-value setting circuit to set an initial value.

Furthermore, on an assumption that since at least a number of clocks prior to a timing of the set initial value spectrum-spreading and thus multiplexing data to be transmitted initially after the transmission operation starts or the multiplexing switches, the number corresponding to a number of chips of a spreading code sequence, data to be transmitted has been continuously spectrum-spread and thus multiplexed by a pattern identical to a timing of multiplexing after the transmission operation started or the multiplexing switched, when the virtual data to be transmitted serving as dummy data are all dummy data of one of a first logic and a second logic and a combination of the first and second logics and subsequent to a result of spectrum-spreading and thus multiplexing the dummy data a result of spectrum-spreading the initial data to be transmitted is to be multiplexed the initial-value setting circuit applies a value of a result of spectrum-spreading and thus multiplexing dummy data located in a portion overlapping therebetween at each chip location.

Still more preferably, when in the spreading code sequence a chip corresponding to the initial operation unit has a first logic value and the multiplexing timing signal is active the initial operation unit outputs data to be transmitted and when the multiplexing timing signal is inactive the initial operation unit outputs a second logic value, and when in the spreading code sequence a chip corresponding to the initial operation unit has a second logic value and the multiplexing timing signal is active the initial operation unit inverts the logic of the data to be transmitted and outputs the same and when the multiplexing timing signal is inactive the initial operation circuit outputs a second logic value.

Still more preferably, the multiplexing timing signal generation circuit includes: a counting circuit initialized by a start signal to count a clock signal, with a period corresponding to a chip length of the spreading code sequence; a decode circuit decoding an output of the counting circuit; and a timing generation circuit driven by an output of the decode circuit to generate a multiplexing timing signal based on a multiplexing parameter and activated at a predetermined timing.

BEST MODE FOR IMPLEMENTING THE INVENTION

Figure 1:
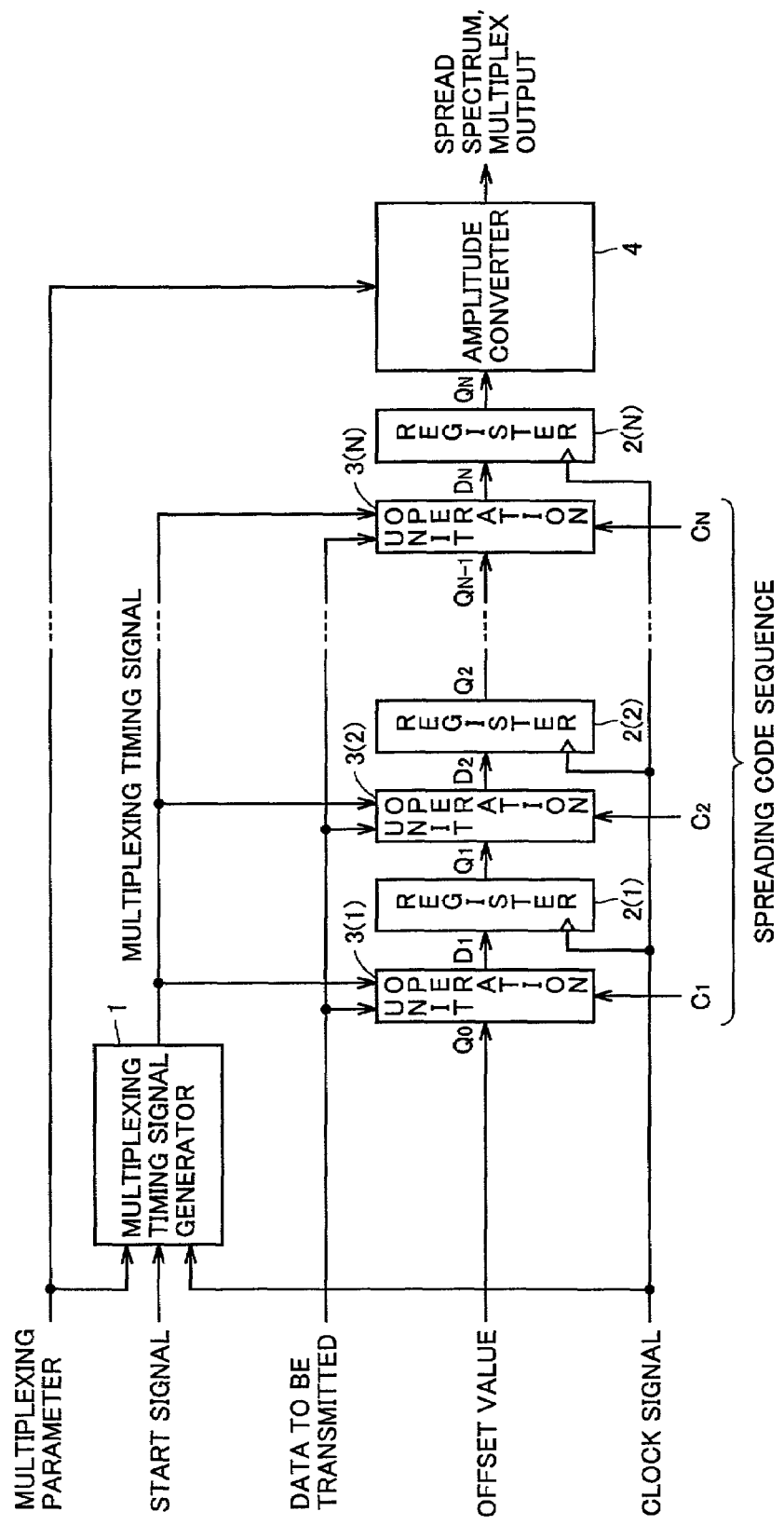
FIG. 1 is a block diagram showing a first embodiment of a spreading and multiplexing circuit in a spread spectrum communication transmitter of the present invention.

FIG. 1 is a block diagram illustrating a first embodiment of a spreading and multiplexing circuit in a spread spectrum communication transmitter of the present invention.

In FIG. 1 the spreading and multiplexing circuit includes a multiplexing timing signal generator 1, registers 2(1)–2(N), operation units 3(1)–3(N), and an amplitude converter 4. Multiplexing timing signal generator 1 starts, as timed by a start signal, and is synchronized with a clock signal having a period equal to a chip rate of the spreading, to generate and output a multiplexing timing signal indicating a timing of effecting a multiplexing process. The multiplexing timing signal is generated from a multiplexing parameter representing one or both of information of a selected number of signals in multiplexing and information of a selected pattern of a timing of the multiplexing. N registers $2(1)$–$2(N)$ each hold a result of a spreading and multiplexing operation obtain at each chip location, wherein N represents a length of a spreading code length.

N operation units $3(1)$–$3(N)$ are provided to correspond to N chips $C_1$–$C_N$, respectively, of a spreading code sequence of a spreading code length N. Operation units $3(1)$–$3(N)$ receive identical data to be transmitted, and the operation unit corresponding to chip $C_1$ receives an offset value and the remaining operation units each receive a value of a register immediately preceding the operation unit, i.e., values $Q_1$-$Q_{N-1}$. When the multiplexing timing signal is active, operation units $3(1)$–$3(N)$ add together the offset value/the values of their respective, immediately preceding registers and the multiplications of the data to be transmitted and spreading code sequence $C_1$–$C_N$, respectively. When the multiplexing timing signal is inactive, operation unit $3(1)$–$3(N)$ output the offset value and the immediately preceding register values $Q_1$-$Q_{N-1}$. Note that the final-stage register $2(N)$ outputs a spread spectrum, multiplex result $Q_N$.

Amplitude converter 4 prevents the value of a spread spectrum, multiplex result from providing an average power varying with the number of signals in multiplexing. More specifically, amplitude converter 4 uses a multiplexing parameter to convert the value of result $Q_N$ and then spreads the spectrum thereof and thus derives a multiplex output. Note that amplitude converter 4 is described in Japanese Patent Laying-Open No. 11 -145932.

The FIG. 1 spreading and multiplexing circuit specifically operates, as described hereinafter. Initially, multiplexing timing signal generator 1 uses a multiplexing parameter indicative of one or both of information of a selected number of signals in multiplexing and information of a selected pattern of a timing of the multiplexing, to generate a multiplexing timing signal activated for each interval corresponding to a number of chips delayed between data to be transmitted in the multiplexing.

For example, if each data to be transmitted is delayed by three chips and thus multiplexed, the multiplexing timing signal is generated to be a signal activated for one of three periods of a clock signal. Furthermore, if multiplexing is timed, such as represented in a repeated pattern, for example a delay chip interval is represented by 2, 2, 2, 2, 3, 2, 2, 2, 2, 3, and the timing of starting the repeated pattern needs to be controlled, a start signal is used to initialize generation of the repeated pattern.

When the multiplexing timing signal is inactive, operation unit $3(1)$–$3(N)$ do not provide any operation, and operation unit $3(1)$ outputs the offset value and the other operation units $3(2)$–$3(N)$ output values $Q_1$-$Q_{N-1}$ received from their respective, immediately preceding registers $2(1)$–$2(N-1)$, as signals $D_1$-$D_N$ input to the respective, immediately following registers $2(1)$–$2(N)$. Thus, the entirety of registers $2(1)$ –$2(N)$ is shifted by one stage and register $2(1)$ receives the offset value.

When the multiplexing timing signal is active, the operation units multiply identical data to be transmitted by spreading code sequence $C_1$–$C_N$, respectively, and a result of spreading the data to be transmitted is obtained for each chip simultaneously. Each chip of the spread spectrum result is added to the offset value for operation unit $3(1)$ while for operation units $3(2)$–$2(N)$ it is converted to values $Q_1$-$Q_{N-1}$ of their respective, immediately preceding registers $2(1)$–$2$ $(N-1)$ and output as signals $D_1$-$D_N$ for their respective, immediately following registers $2(1)$–$2(N)$ to provide a multiplexing process. Since a subsequent one of registers $2(1)$ through $2(N)$ holds a value greater in range than a preceding one of the registers and if the offset value is a fixed value, setting registers $2(1)$–$2(N)$ to correspond to a minimal number of bits required for protecting a possible range of a value taken thereby, can reduce the scale of the circuit.

Thus, data to be transmitted has its spectrum spread by spreading code sequence $C_1$–$C_N$ and a result of multiplexing in response to a multiplexing timing signal is synchronized with a clock signal to be output from register $2(N)$ by one chip. Furthermore, amplitude converter 4 is driven by a multiplexing parameter to convert output $Q_N$ of register $2(N)$, spread the spectrum thereof and output a multiplex signal to maintain constant power for each number of signals in multiplexing.

Figure 2:
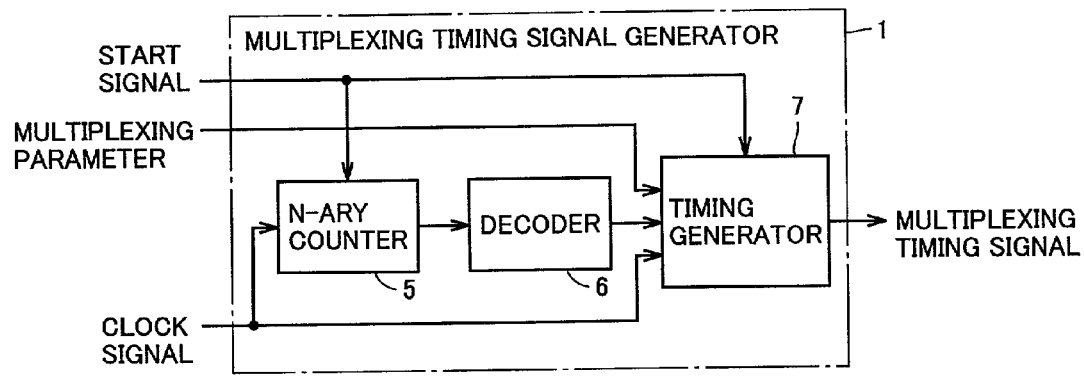
FIG. 2 is a block diagram showing one example of a multiplexing timing signal generator of a spreading and multiplexing circuit in a spread spectrum communication transmitter of the present invention.

FIG. 2 is a block diagram showing an example of a multiplexing timing signal generator of a spreading and multiplexing circuit of the present invention. The FIG. 2 generator is applied when a delay chip interval is represented by a repeated pattern with a period corresponding to the spreading code length N.

In FIG. 2, multiplexing timing signal generator 1 is configured by an N-ary counter 5, a decoder 6 and a timing generator 7. N-ary counter 5 detects a clock signal which is in turn decoded by decoder 6. Timing generator 7 is driven by a result received from decoder 6 and a multiplexing parameter and synchronized with the clock signal to output a multiplexing timing signal. N-ary counter 5 and timing generator 7 are initialized by a start signal.

Figure 3:
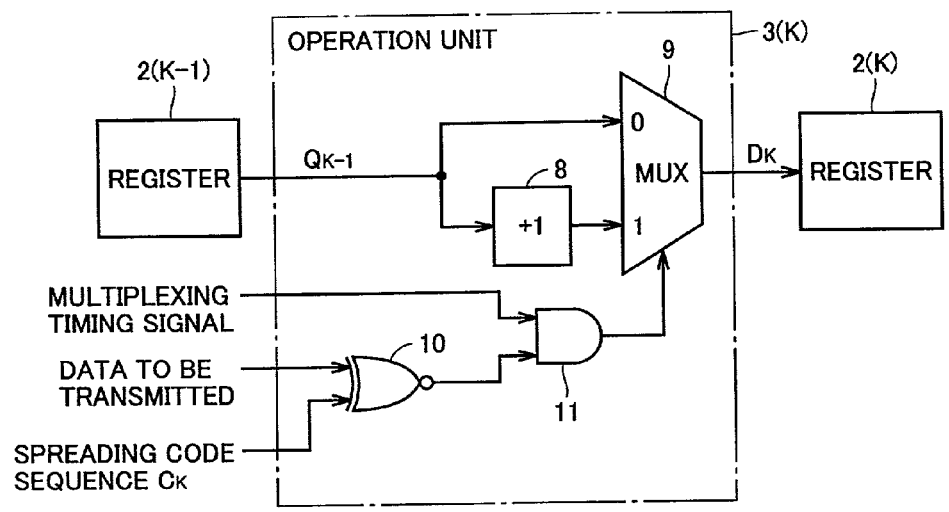
FIG. 3 is a block diagram showing one example of an operation unit in the FIG. 1 spreading and multiplexing circuit.

FIG. 3 is a block diagram showing one example of the FIG. 1 operation unit. The FIG. 3 operation unit is activated when the multiplexing timing signal is logical "1". In FIG. 3, K represents any representative value from 1 to N (a spreading code length). For K=1 or operation unit $3(1)$, an input $Q_0$ is set to be an offset value.

In FIG. 3, operation units $3(1)$–$3(N)$ are configured by a 1-incrementer 8, a multiplexer 9, an XNOR operation unit 10, and an AND operation unit 11. If operation units $3(1)$–$3(N)$ have K=1, 1-incrementer 8 adds the offset value, and otherwise increments output $Q_{K-1}$ of the immediately preceding register $2(K-1)$ by one. If data to be transmitted has the same value as spreading code sequence $C_K$, XNOR operation unit 10 outputs "1" as a result of a multiplication of the same sign and otherwise outputs "0" as a result of a multiplication of a different sign. AND operation unit 11 calculates a logical product of the multiplexing timing signal and an output received from XNOR operation unit 10. Multiplexer 9 selects the offset value or the preceding register output $Q_{K-1}$ and an output of 1-incrementer 8. Note that if a multiplexing timing signal is activated for logical "0", its logic is an inverted logic.

Figures 4, 5:
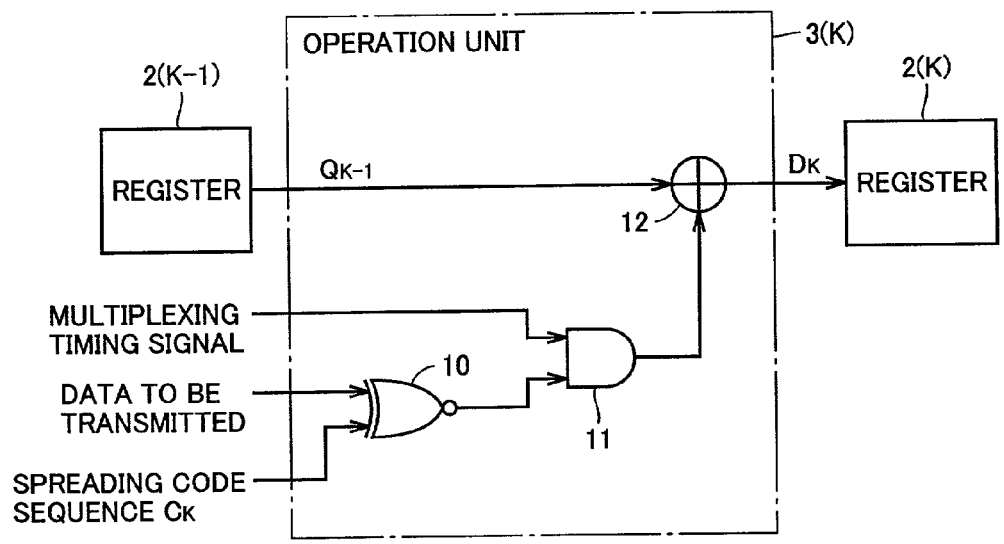
FIG. 4 is a block diagram showing another example of the operation unit in the FIG. 1 spreading and multiplexing circuit.
FIG. 5 exemplarily compares a value of an output of a conventional spreading and multiplexing circuit and that of an output of a spreading and multiplexing circuit of the present invention.

FIG. 4 is a block diagram showing another example of the FIG. 1 operation unit, wherein the multiplexing timing signal is activated for logical "1".

In FIG. 4, operation units $3(1)$–$3(N)$ are configured by XNOR operation unit 10, AND operation unit 11 and an adder 12. If data to be transmitted has the same value as spreading code sequence $C_K$, XNOR operation unit 10 outputs "1" as a result of a multiplication by the same sign, and otherwise outputs "0" as a result of a multiplication by a different sign. AND operation unit 11 outputs a logical product of an output received from XNOR operation unit 10 and the multiplexing timing signal. Adder 12 for K=1 adds together the offset value and an output received from AND operation unit 11, and otherwise adds together output $Q_{K-1}$ of the immediately preceding register 2(K−1) and the output received from AND operation unit 11.

Note that if the multiplexing timing signal is activated for logical "0", its logic is an inverted logic. The FIGS. 3 and 4 operation units increment the offset value or the immediately preceding register's value by one when data to be transmitted and spreading code sequence chip $C_1$–$C_N$ match in value at a timing of a clock when the multiplexing timing signal is activated for logic "1". The configuration of the FIG. 3 or 4 operation unit allows the FIG. 1 spreading and multiplexing circuit to provide spread spectrum result $Q_N$ ranging in value from the offset value to "a number of signals in multiplexing+the offset value". Consequently, with "1" corresponding to a multiplication of an identical sign in a conventional spread spectrum circuit and "−1" corresponding to a multiplication of a different sign therein, there is provided a one to one correspondence to a result obtained through addition and subtraction.

FIG. 5 represents an example of comparing a value of a spread spectrum result output of the present invention and that of a spread spectrum result output in a conventional, exemplary spreading and multiplexing circuit.

Figure 6:
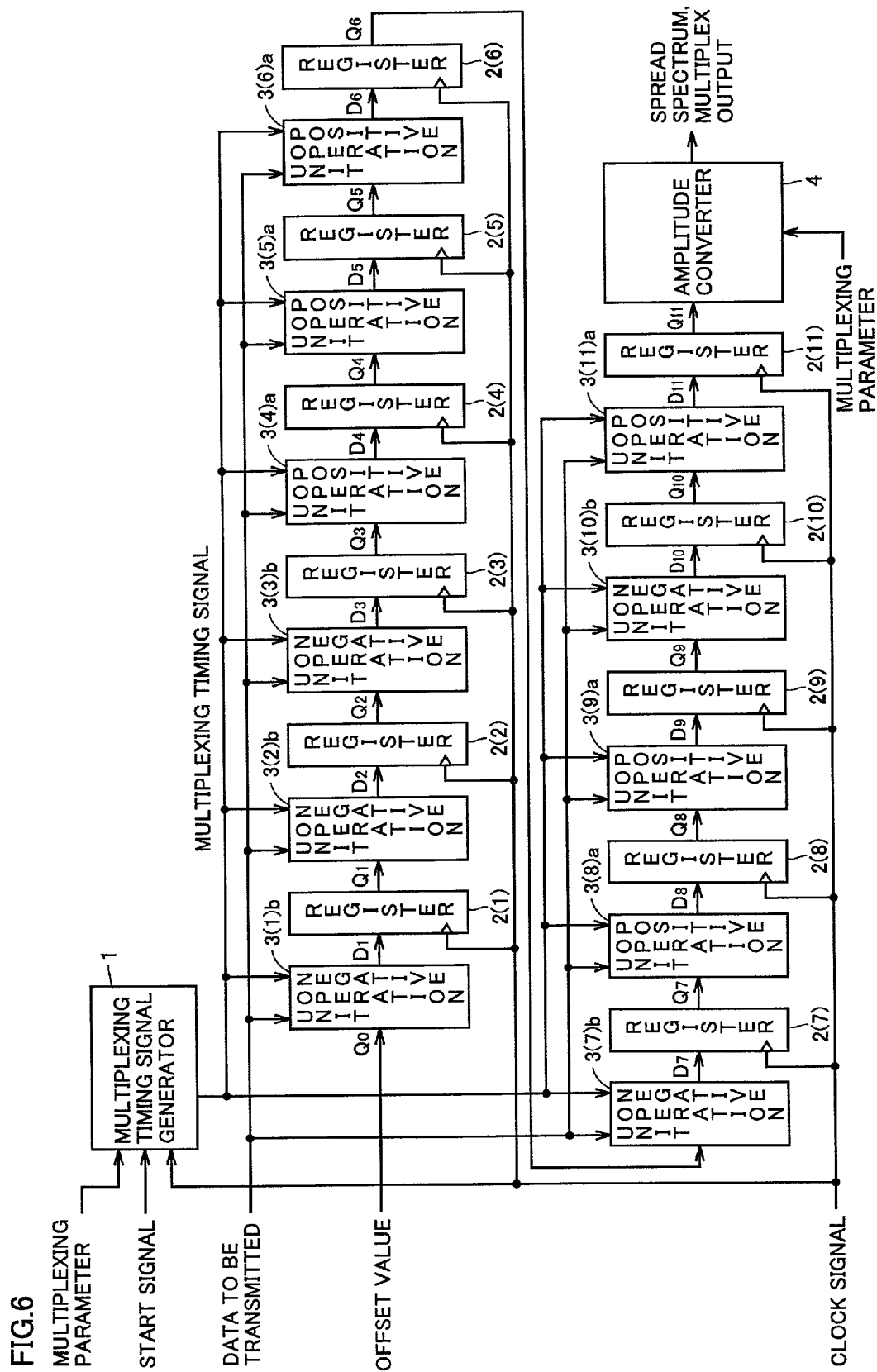
FIG. 6 is a block diagram showing a second embodiment of the spreading and multiplexing circuit in the spread spectrum communication transmitter of the present invention.

FIG. 6 is a block diagram showing a second embodiment of the spreading and multiplexing circuit in the spread spectrum communication transmitter of the present invention. The FIG. 6 circuit corresponds to the FIG. 1 circuit with the spreading code sequence fixed and operation units 3(1)–3(N) having a different configuration to be a positive operation unit with a corresponding, spreading code sequence chip of "1" and a negative operation unit with a corresponding, spreading code sequence chip of " " to reduce the scale of the circuit. Note that in the FIG. 6 circuit, the spreading code sequence is specifically a 11-chip, chip barker code "10110111000", by way of example, having a top corresponding to $C_{11}$, a chip chronologically top in transmission.

In FIG. 6, the spreading and multiplexing circuit is configured by multiplexing timing signal generator 1, registers 2(1)–2(11), positive operation units 3(4)a, 3(5)a, 3(6)a, 3(8)a, 3(9)a, 3(11)a, and negative operation units 3(1)b, 3(2)b, 3(3)b, 3(7)b, 3(10)b. Multiplexing timing signal generator 1 is identical to that shown in FIGS. 1 and 11 paired registers 2(1)–2(11) are provided to correspond to a spreading code length holding a result of a spreading and multiplexing operation for each chip location.

Positive operation units 3(4)a–3(11)a are provided to each correspond to a chip of the 11-chip barker code serving as a spread code sequence and receive identical data to be transmitted and a positive operation unit corresponding to an initial stage receives an offset value and the other positive operation units receive their respective, immediately preceding registers' values $Q_{-1}$–$Q_{10}$. When the multiplexing timing signal is active, the operation units with their spreading code sequence chips of "1" add together the immediately preceding registers' values $Q_3$, $Q_4$, $Q_5$, $Q_7$, $Q_8$, $Q_{10}$ and data to be transmitted, and when the multiplexing timing signal is inactive they output values $Q_3$, $Q_4$, $Q_5$, $Q_7$, $Q_8$, $Q_{10}$. When the multiplex in the timing signal is active, negative operation units 3(1)b–3(10)b with their spreading code sequence chips of "0" add together the offset value/the immediately preceding registers' values $Q_1$, $Q_2$, $Q_6$, $Q_9$, and an inverted version of data to be transmitted, and when the multiplexing timing signal is inactive, the negative operation units output the offset value and values $Q_1$, $Q_2$, $Q_6$, $Q_9$. Thus the final register 2(11) outputs a spread spectrum, multiplex result $Q_{11}$.

Note that a subsequent register holds a value greater in range than a preceding register and if the offset value is a fixed value registers 2(1)–2(11) can be configured by a minimal number of bits required to hold a possible range of a value taken thereby, to reduce the scale of the circuit.

Furthermore, each positive and negative operation unit can similarly be configured by an operation depending on a minimal number of bits required, to reduce the scale of the circuit. Furthermore, amplitude converter 4 uses a multiplexing parameter to convert the value of spread spectrum, multiplex result $Q_{11}$ and then spreads the spectrum thereof and outputs a multiplex signal to prevent the value of the result from providing an average power varying with the number of signals in multiplexing.

Figure 7:
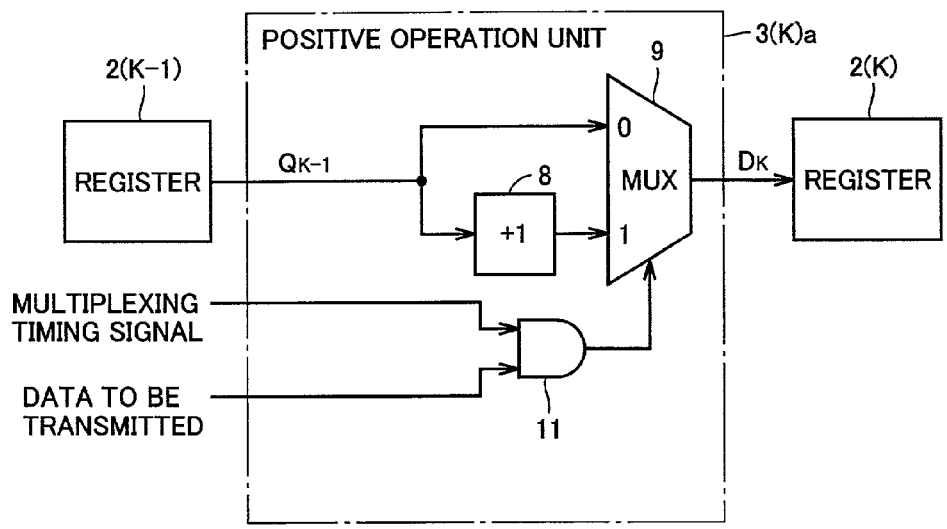
FIG. 7 is a block diagram showing one example of a positive operation unit in the FIG. 6 spreading and multiplexing circuit.

FIG. 7 is a block diagram showing one example of the FIG. 6 positive operation unit, wherein the multiplexing timing signal is activated for logic "1".

In FIG. 7, K represents any representative value indicating the location of a chip of "1" of a spreading code sequence and for a 11-chip barker code when the top of "10110111000" corresponds to chip $C_{11}$, a chip that is chronologically initially transmitted, K represents any representative value of 4, 5, 6, 8, 9, 11. Furthermore, for a spreading code sequence with K=1 corresponding to a positive operation unit, the input $Q_0$ is set to be an offset value.

In FIG. 7, the positive operation unit's 1-incrementer 8 increments the offset value by one for K=1 and otherwise increments output $Q_{K-1}$ received from the immediately preceding register 2(K−1) by one. If the multiplexing timing signal and data to be transmitted have the same value of "1" AND operation unit 11 outputs "1" and otherwise outputs "0". Multiplexer 9 is driven by an output of AND operation unit 11 to select the offset value/the immediately preceding register output $Q_{K-1}$ and an output of 1-incrementer 8. Note that if the multiplexing timing signal is activated for logical "0" its logic in the above configuration is an inverted logic.

Figure 8:
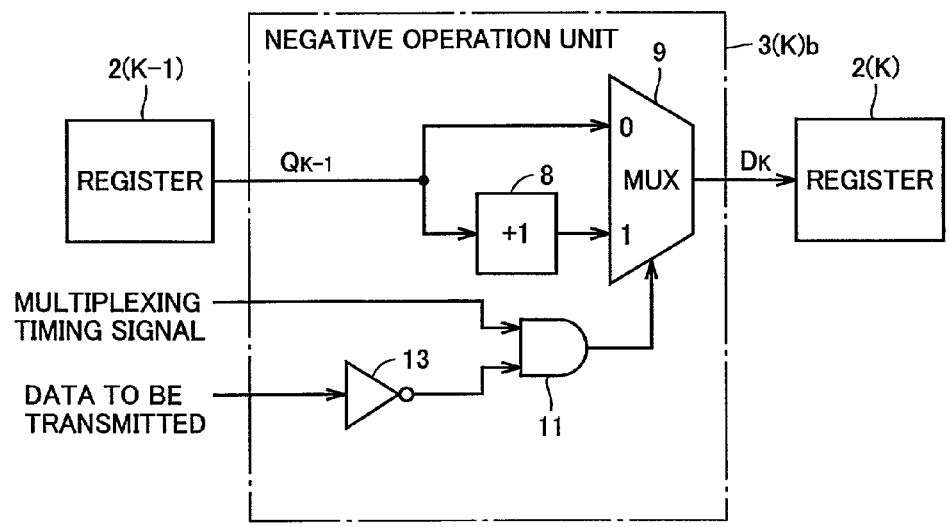
FIG. 8 is a block diagram showing one example of a negative operation unit in the FIG. 6 spreading and multiplexing circuit.

FIG. 8 is a block diagram showing an example of FIG. 6 negative operation unit, wherein the multiplexing timing signal is activated when for logical "1".

In FIG. 8, K is any representative value indicating the location of a chip of "0" of a spreading code sequence and for a 11-chip barker code when "110111000" has a top corresponding to chip $C_{11}$, a chip chronologically top in transmission, K is any representative value of 1, 2, 3, 7, 10. Furthermore, for a spreading code sequence with K=1 corresponding to a negative operation unit, the input $K_0$ is set to be an offset value.

In FIG. 8, the negative operation unit is configured by 1-incrementer 8, inverter 13, AND operation unit 11 and multiplexer 9. 1-incrementer 8 increments the offset value by one for K=1 and otherwise increments output $Q_{K-1}$ of the immediately preceding register 2(K−1) by one. Inverter 13 inverts the logic of data to be transmitted and outputs the data to AND operation unit 11. If the multiplexing timing signal and the output of inverter 13 are both "1" AND operation unit 11 outputs "1" and otherwise outputs "0". Multiplexer 9 is driven by an output of AND operation unit 11 to select the offset value/the immediately preceding register output $Q_{K-1}$ and an output of 1-increment 8.

Figure 9:
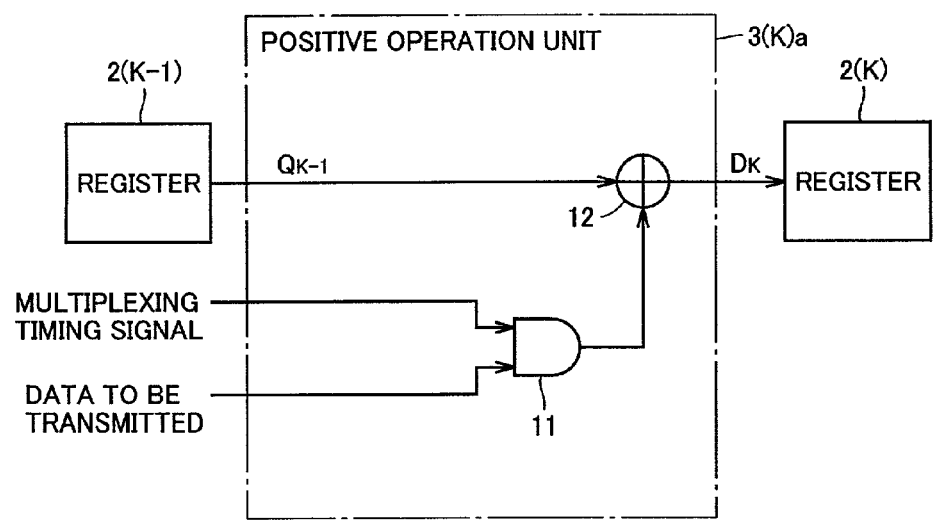
FIG. 9 is a block diagram showing another example of the positive operation unit in the FIG. 6 spreading and multiplexing circuit.

FIG. 9 is a block diagram showing another example of the FIG. 6 positive operation unit, wherein the multiplexing timing signal is activated for logical "1".

In FIG. 9, K is a representative value similar to that of FIG. 7. Furthermore, for a spreading code sequence with K=1 corresponding to a positive operation unit, the input $Q_0$ is set to be an offset value.

In FIG. 9 the positive operation unit is configured by AND operation unit 11 and adder 12. If the multiplexing timing signal and data to be transmitted both have a value of "1" then AND operation unit 11 outputs "1" and otherwise outputs "0". Adder 12 adds an output of AND operation unit 11 to the offset value/the immediately preceding register output $Q_{K-1}$. Note that if the multiplexing timing signal is activated for logical "0" its logic is an inverted logic.

Figure 10:
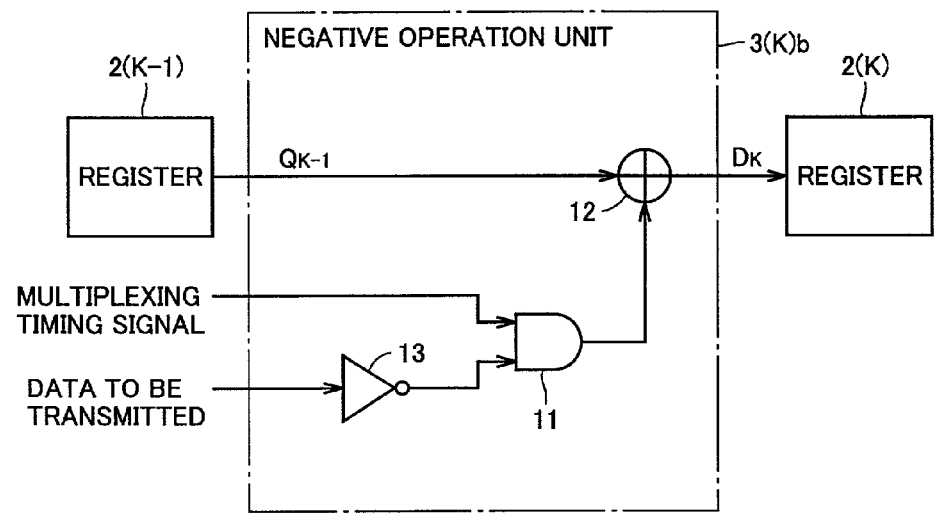
FIG. 10 is a block diagram showing another example of the negative operation unit in the FIG. 6 spreading and multiplexing circuit.

FIG. 10 is a block diagram showing another example of the FIG. 6 negative operation unit, wherein the multiplexing timing signal is activated for logical "1". K in FIG. 10 is a representative value, as has been described in FIG. 8, and for a spreading code sequence with K=1 corresponding to a negative operation unit the input $Q_0$ is set to be an offset value.

In FIG. 10 the negative operation unit is configured by inverter 13, AND operation unit 11 and adder 12. Inverter 13 inverts the logic of data to be transmitted and if the multiplexing timing signal and an output of inverter 13 are both "1" AND operation unit 11 outputs "1", and otherwise outputs "0". Adder 12 adds an output of AND operation unit 11 to the offset value/the immediately preceding register output $Q_{K-1}$. If the multiplexing timing signal is activated for a logical "0" its logic is an inverted logic.

Figure 11:
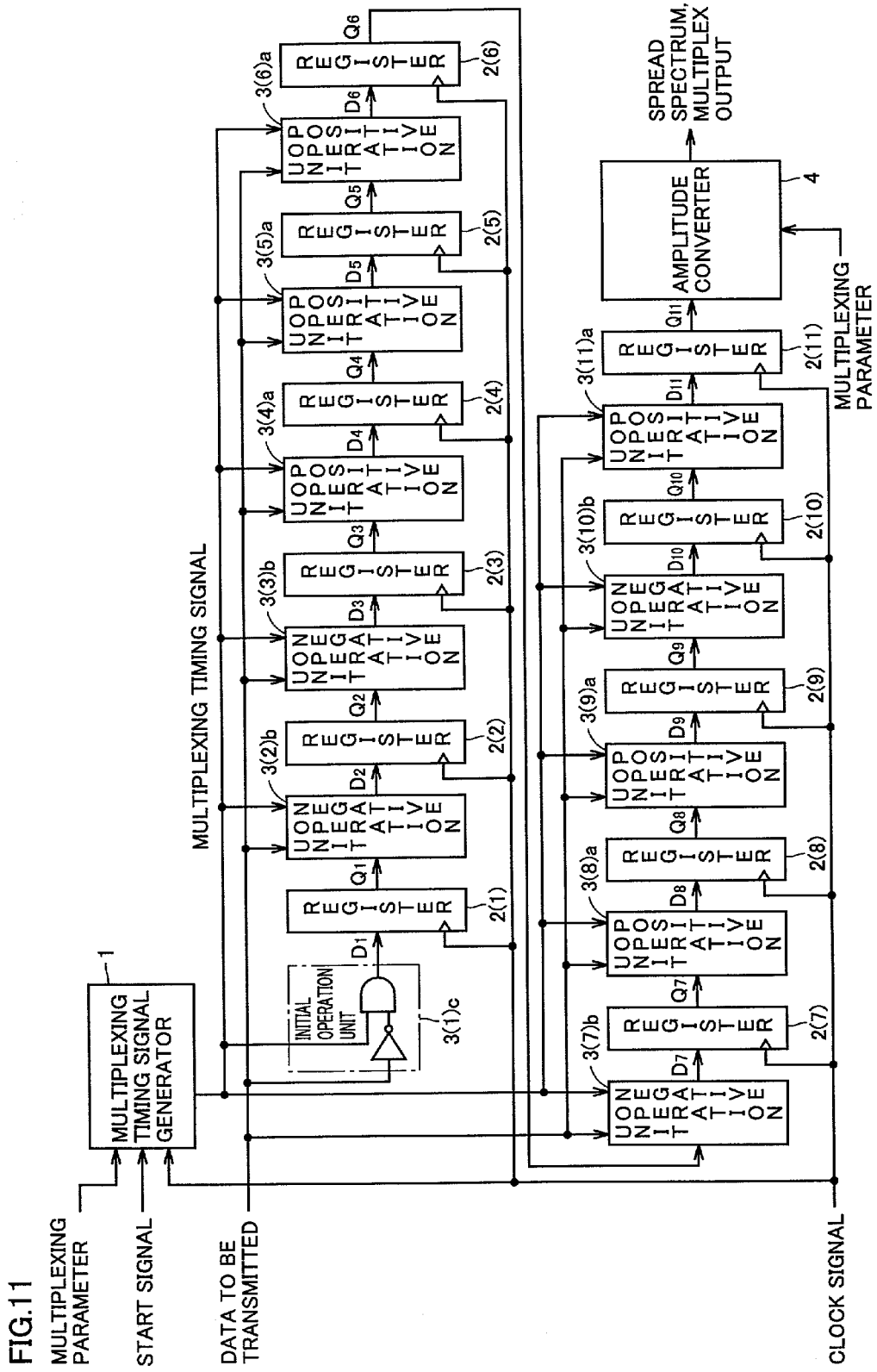
FIG. 11 is a block diagram showing a third embodiment of the spreading and multiplexing circuit in the spread spectrum communication transmitter of the present invention.

FIG. 11 is a block diagram showing a third embodiment of the spreading and multiplexing circuit in the spread spectrum communication transmitter of the present invention. The FIG. 11 circuit contemplates reducing the scale of the FIG. 6 circuit with an offset value fixed to be "0". The FIG. 11 circuit differs from the FIG. 6 circuit, as follows:

In the FIG. 11 circuit, an offset value is fixed to be "0" and negative operation unit 3(1)b in the FIG. 6 circuit is accordingly replaced by an initial-stage operation unit 3(1)c. Initial operation unit 3(1)c outputs a logical product of a multiplexing timing signal and data to be transmitted inverted in logic. Furthermore, register 2(1) is adapted to have one bit and subsequent registers 2(2)–2(11) and positive operation units 3(4)a, 3(5)a, 3(6)a, 3(8)a, 3(9)a, 3(11)a, and negative operation units 3(2)b, 3(3)b, 3(7)b, 3(10)b are each configured of a minimal number of bits required that is determined from a maximal value of input and output possibly taken thereby.

Note that if a spreading code sequence of "1" corresponds to the initial operation unit, initial operation unit 3(1)c is configured simply by an AND operation unit providing a logical product of a multiplexing timing signal and data to be transmitted.

Figure 12:
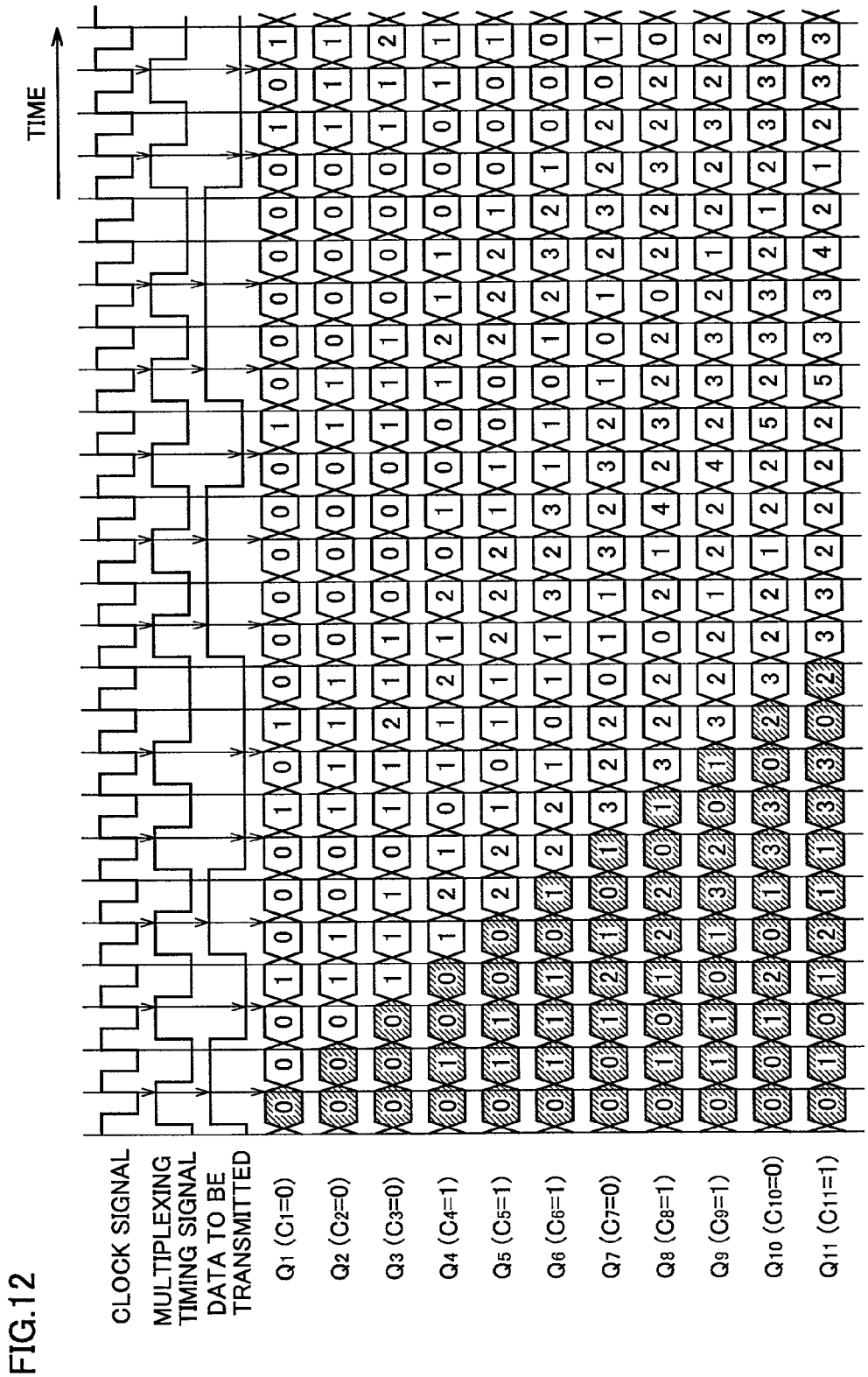
FIG. 12 is an exemplary timing chart for the FIGS. 6 and 11 spreading and multiplexing circuits.

FIG. 12 is a timing chart of each signal in the FIG. 11 spreading and multiplexing circuit.

Note that in FIG. 12, the multiplexing timing signal is activated for logical "1", the offset value is set to be "0", and registers 2(1)–2(11) each takes in data when a clock signal transitions from low to high.

Furthermore, the spreading code sequence is a 11-bit barker code "10110111000", having a top corresponding to $C_{11}$ of the spreading code sequence.

In FIG. 12 an arrow indicates a timing at which the multiplexing timing signal is active when a clock signal transitions from low to high. At this timing, data to be transmitted is subjected to a spreading and multiplexing operation. At the timing indicated by the arrow, outputs $Q_1$–$Q_{11}$ of registers 2(1)–2(11) are updated to a result of spreading data to be transmitted with spreading code sequence $Q_1$–$Q_{11}$, i.e., "10110111000" plus the immediately preceding register value for data to be transmitted of "1", and "01001000111" plus the immediately preceding register value for data to be transmitted of "0".

Note that in FIG. 12, registers 2(1)–2(11) start to operate from an initial status which does not hold a spread spectrum, multiplex result or any intermediate result. The hatched portions of $Q_1$–$Q_{11}$ represent that because of an effect of the initial status a number of multiplexed data to be transmitted does not reach that of signals in multiplexing that is provided by a multiplexing timing signal.

Figure 13:
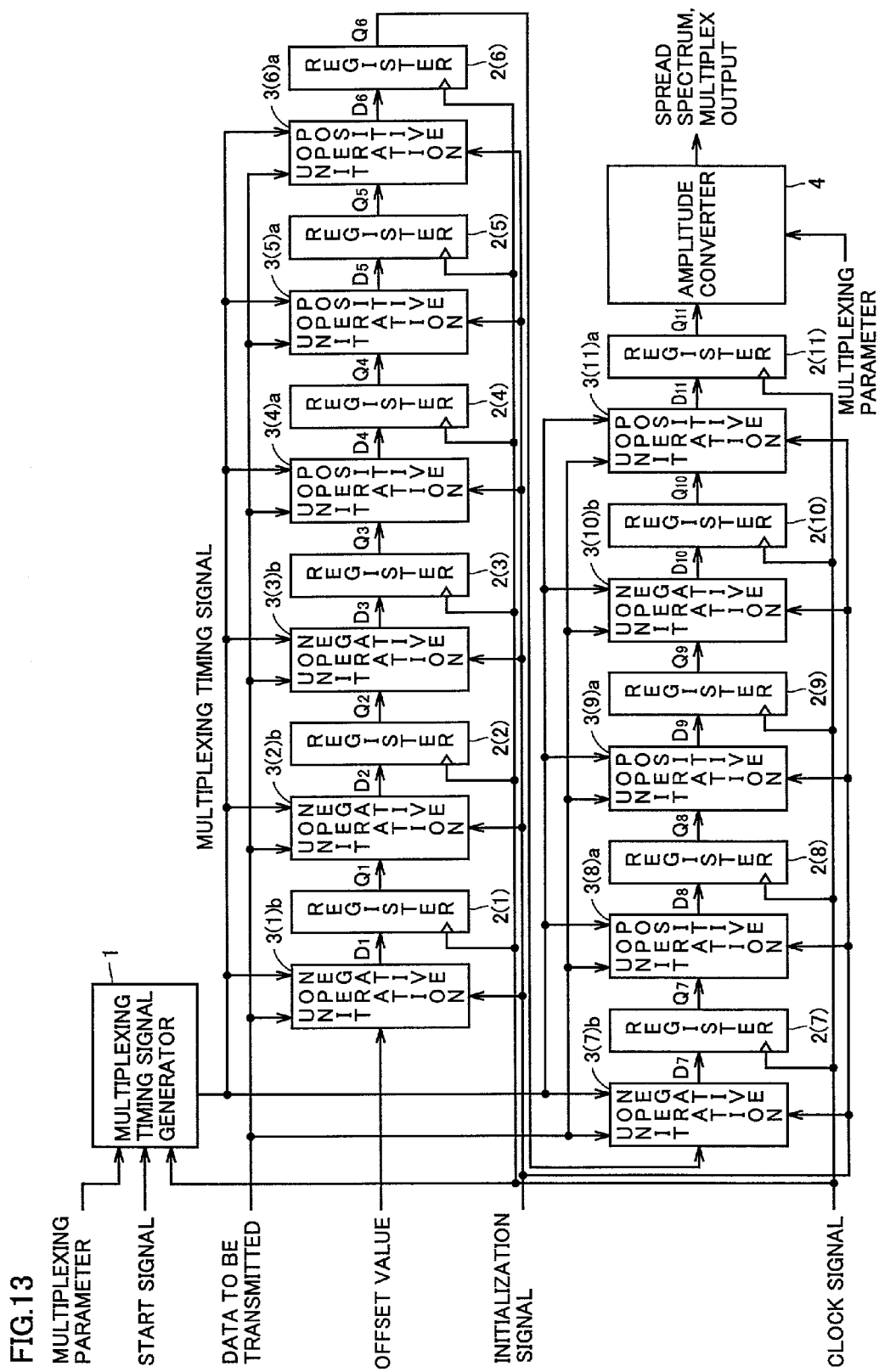
FIG. 13 is a block diagram showing a fourth embodiment of the spreading and multiplexing circuit in the spread spectrum communication transmitter of the present invention.

FIG. 13 is a block diagram showing a fourth embodiment of the spreading and multiplexing circuit of the spread spectrum communication transmitter of the present invention. The FIG. 13 circuit corresponds to the FIG. 6 circuit with the positive and negative operation units provided with a function to set an initial value. The FIG. 13 circuit differs from the FIG. 6 circuit, as follows:

In the FIG. 13 circuit, when a number of signals in multiplexing and a pattern of a timing of the multiplexing switch to another and a transmission operation starts from an initial status of the circuit, an initialization signal indicating a timing of setting an initial value and a number of signals in multiplexing that is targeted in the switching, is input to positive operation units 3(4)a, 3(5)a, 3(6)a, 3(8)a, 3(9)a, 3(11)a and negative operation units 3(1)b, 3(2) b, 3(3)b, 3(7)b, 3(10)b. Driven by the initialization signal, initialization is effected in each operation unit.

Figure 14:
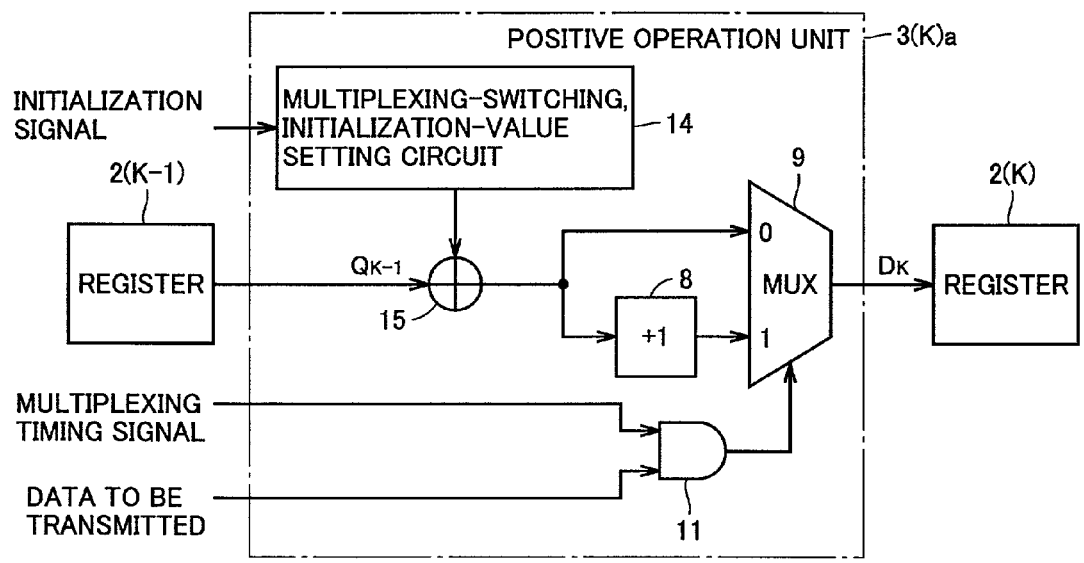
FIG. 14 is a block diagram showing an example of a positive operation unit in the FIG. 13 spreading and multiplexing circuit.

FIG. 14 is a block diagram showing an example of the FIG. 13 positive operation unit, wherein the multiplexing timing signal is activated for logical "1".

In FIG. 14, K is any representative value indicating the location of a chip "1" in a spreading code sequence and for a 11-chip barker code when "10110111000" has a top corresponding to chip $C_{11}$, a chronologically top chip in transmission, K is any representative value of 4, 5, 6, 8, 9, 11.

Furthermore, for a spreading code sequence with K=1 corresponding to a positive operation unit, the input $Q_0$ is set to be an offset value. In FIG. 14, the positive operation unit includes AND operation unit 11, a multiplexing-switching, initial-value setting circuit 4, 1-incrementer 8 and multiplexer 9. If the multiplexing timing signal and data to be transmitted both have a value of "1" AND operation unit 11 outputs "1", and otherwise "0". Circuit 14 receives an initialization signal, and only at a timing of multiplexing-switching and that of starting an operation from an initial status of the circuit it is driven by a chip location, or K, and a number of signals in multiplexing and a pattern of a timing of the multiplexing to output a respective, different initialization value, and at other timings it outputs "0". Adder 15 adds together the offset value/the immediately preceding register output $Q_{K-1}$ and an output of circuit 14 together. 1-incrementer 8 increments an output of adder 15 by one. Multiplexer 9 is driven by an output of AND operation unit 11 to select the output of adder 15 and that of 1-incrementer 8. Note that if the multiplexing timing signal is activated for logical "0" then in the above configuration the signal's logic is an inverted logic.

Figure 15:
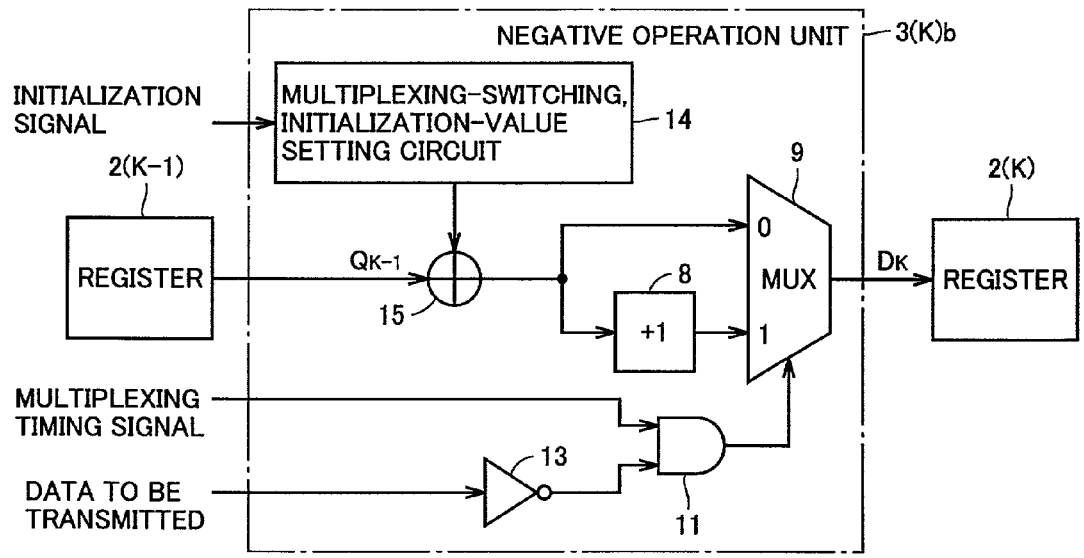
FIG. 15 is a block diagram showing an example of a negative operation unit in the FIG. 13 spreading and multiplexing circuit.

FIG. 15 is a block diagram showing an example of the FIG. 13 negative operation unit, wherein the multiplexing timing signal is activated for logical "1".

In FIG. 15, K is any representative value indicating a location of a chip "0" in a spreading code sequence and for a 11-chip barker code when "10110111000" has a top corresponding to a chronologically top chip $C_{11}$ in transmission K is any representative value of 1, 2, 3, 7, 10.

Furthermore, for a spreading code sequence with K=1 corresponding to a negative operation unit, the input $Q_0$ is set to be an offset value.

In FIG. 15, the negative operation unit includes inverter 13, AND operation unit 11, multiplexing-switching, initial value setting circuit 14, adder 15, 1-incrementer 8 and multiplexer 9. Inverter 13 inverts the logic of data to be transmitted. If the multiplexing timing signal and an output of inverter 13 are both "1", AND operation unit 11 outputs "1", and otherwise outputs "0". Circuit 14 receives an initialization signal, and only at a timing of multiplexing-switching and that of starting an operation from an initial status of the circuit it is driven by a chip location of the negative operation unit, or K, and a number of signals in multiplexing and a pattern of a timing of the multiplexing to output a respective, different, set initial value, and at other timings it outputs "0". Adder 15 adds the offset value/the immediately preceding register output $Q_{K-1}$ and an output of circuit 14 together. 1-incrementer 8 increments an output of adder 15 by one. Multiplexer 9 is driven by an output of AND operation unit 11 to select an output of 1-incrementer 8 and that of adder 15. Note that if the multiplexing timing signal is activated for logical "0" its logic is an inverted logic.

Figure 16:
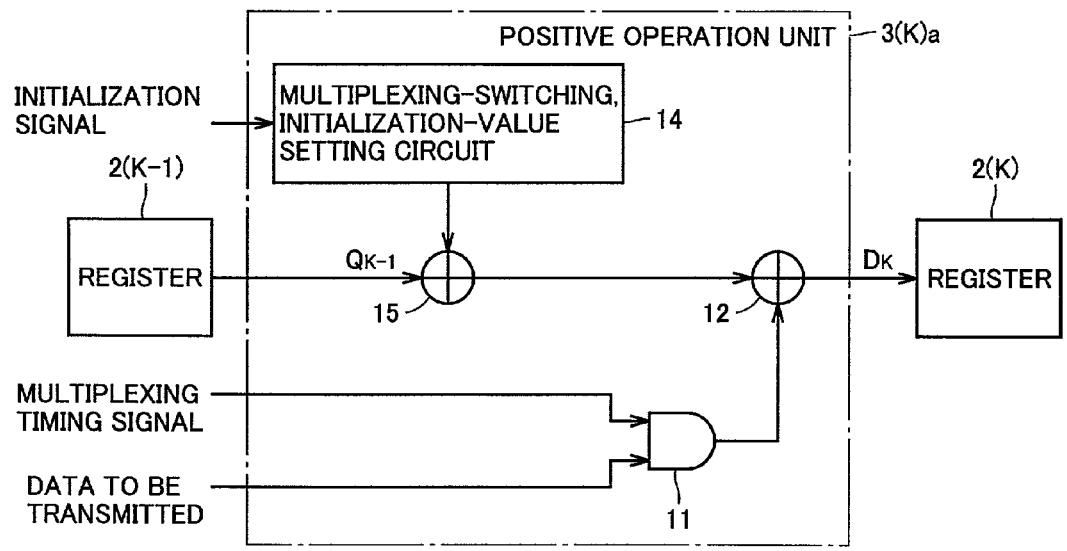
FIG. 16 is a block diagram showing another example of the positive operation unit in the FIG. 13 spreading and multiplexing circuit.

FIG. 16 is a block diagram showing another example of the FIG. 13 positive operation unit, wherein the multiplexing timing signal is activated for "1".

In FIG. 16, K is the same as FIG. 14 and it is any representative value indicating a location of a chip "1" in a spreading code sequence and for a 11-chip barker code when "10110111000" has a top corresponding to a chronologically top chip $C_{11}$ in transmission K is any representative value of 4, 5, 6, 8, 9, 11.

Furthermore, for a spreading code sequence with K=1 corresponding to a positive operation unit, the input $Q_0$ is set to be an offset value.

In FIG. 16 the positive operation unit includes AND operation unit 11, multiplexing-switching, initial value setting circuit 14 and adder 15. If the multiplexing timing signal and data to be transmitted are both "1" AND operation unit 11 outputs "1" and otherwise outputs "0". Circuit 14 receives an initialization signal and only at a timing of multiplexing-switching and that of starting an operation from an initial status of the circuit it is driven by a chip location, or K, and a number of signals in multiplexing and a pattern of a timing of the multiplexing to output a respective, different, set initial value, and at other timings it outputs "o". Adder 15 adds together the offset value/the immediately preceding register output $Q_{K-1}$ and an output of circuit 14. Adder 12 adds an output of adder 15 and that of AND operation unit 11 together. If the multiplexing timing signal is activated for logical "0", its logic is an inverted logic.

Figure 17:
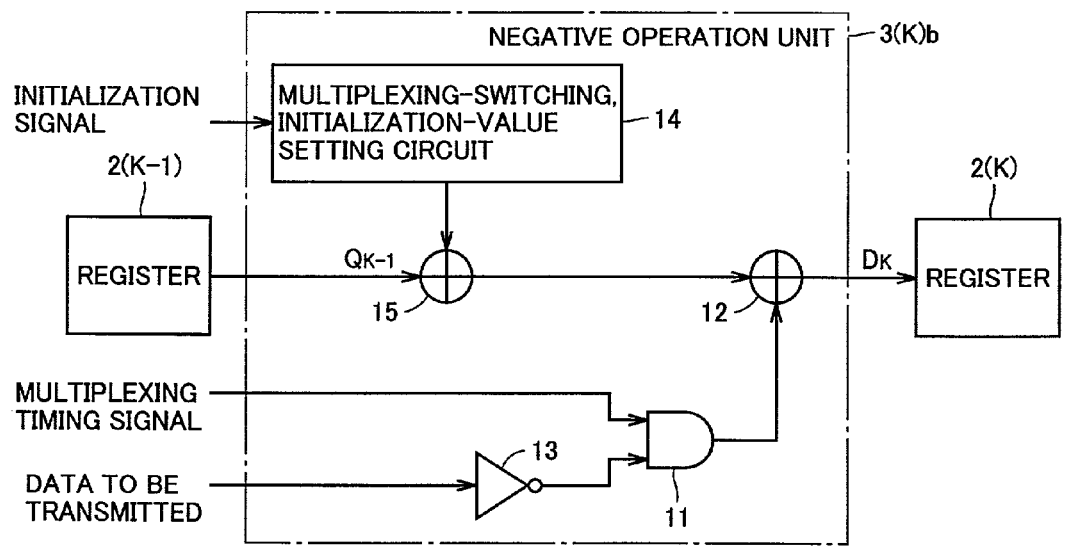
FIG. 17 is a block diagram showing another example of the negative operation unit in the FIG. 13 spreading and multiplexing circuit.

FIG. 17 is a block diagram showing another example of the FIG. 13 negative operation unit, wherein the multiplexing timing signal is activated for logical "1". The FIG. 17 negative operation unit is identical in configuration to the FIG. 16 positive operation unit, except that inverter 13 inverts the logic of data to be transmitted and provides it to AND operation unit 11.

Figure 18:
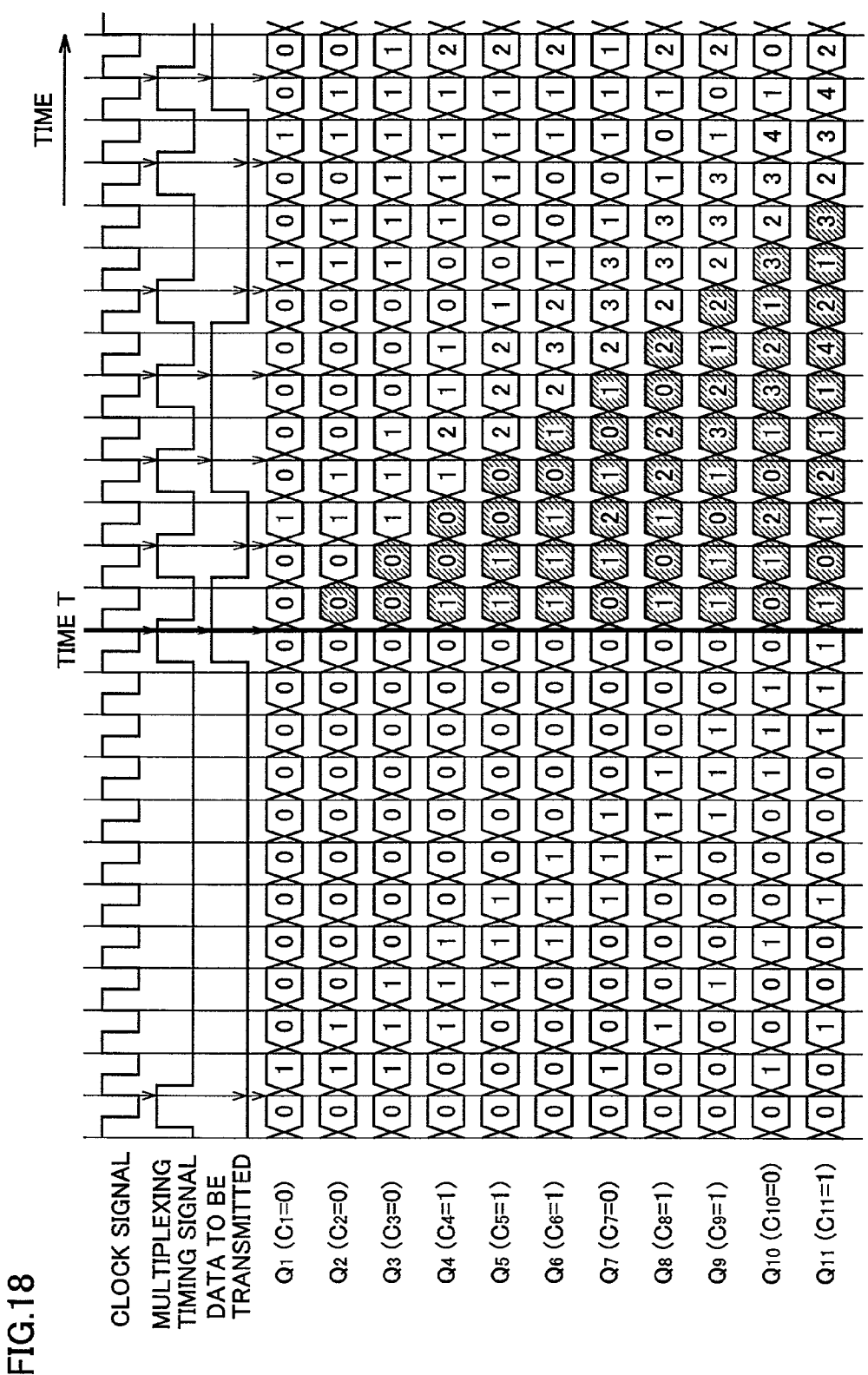
FIG. 18 is an exemplary timing chart of each signal in the FIGS. 6 and 11 spreading and multiplexing circuits when a number of signals in multiplexing is switched to a different number thereof.

FIG. 18 is an exemplary timing chart of each signal when in the FIGS. 16 and 11 circuits no-multiplexing is switched to 5-multiplexing with a chip interval for a timing of the multiplexing corresponding to a repetition of 2, 2, 2, 2, 3.

A number of signals in multiplexing is switched at a timing, as indicated in FIG. 18 at a time T. Note that in FIG. 18, the multiplexing timing signal is activated for logical "1", the offset value is indicated by "0" and registers 2(1)–2(11) take in data when a clock signal transitions from low to high. Furthermore, the spreading code sequence is a 11-bit barker code "10110111000", having a top corresponding to $C_{11}$ of the spreading code sequence. In FIG. 18, an arrow indicates a timing at which the multiplexing timing signal is activated when the clock signal transitions from low to high. At this timing a transmission spreading and multiplexing operation is effected.

In FIG. 18, at the timing indicated by the arrow, outputs $Q_1$–$Q_{11}$ of registers 2(1)–2(11) are updated to a result of spreading data to be transmitted with spreading code sequence $C_1$–$C_{11}$, i.e., "10110111000" plus their respective, immediately preceding register values for data to be transmitted of "1", and "01001000111" plus their respective, immediately preceding register values for data to be transmitted of "0". Note that $Q_1$ is an offset value of "0". Neither FIGS. 6 nor 11 circuits do not have an initial-value setting circuit and when a number of signals in multiplexing is switched to another at time T, as shown in FIG. 18, there exists at a hatched portion of Q2–Q11 a chip which does not satisfy a number of signals in multiplexing that is targeted in the switching.

Figure 19:
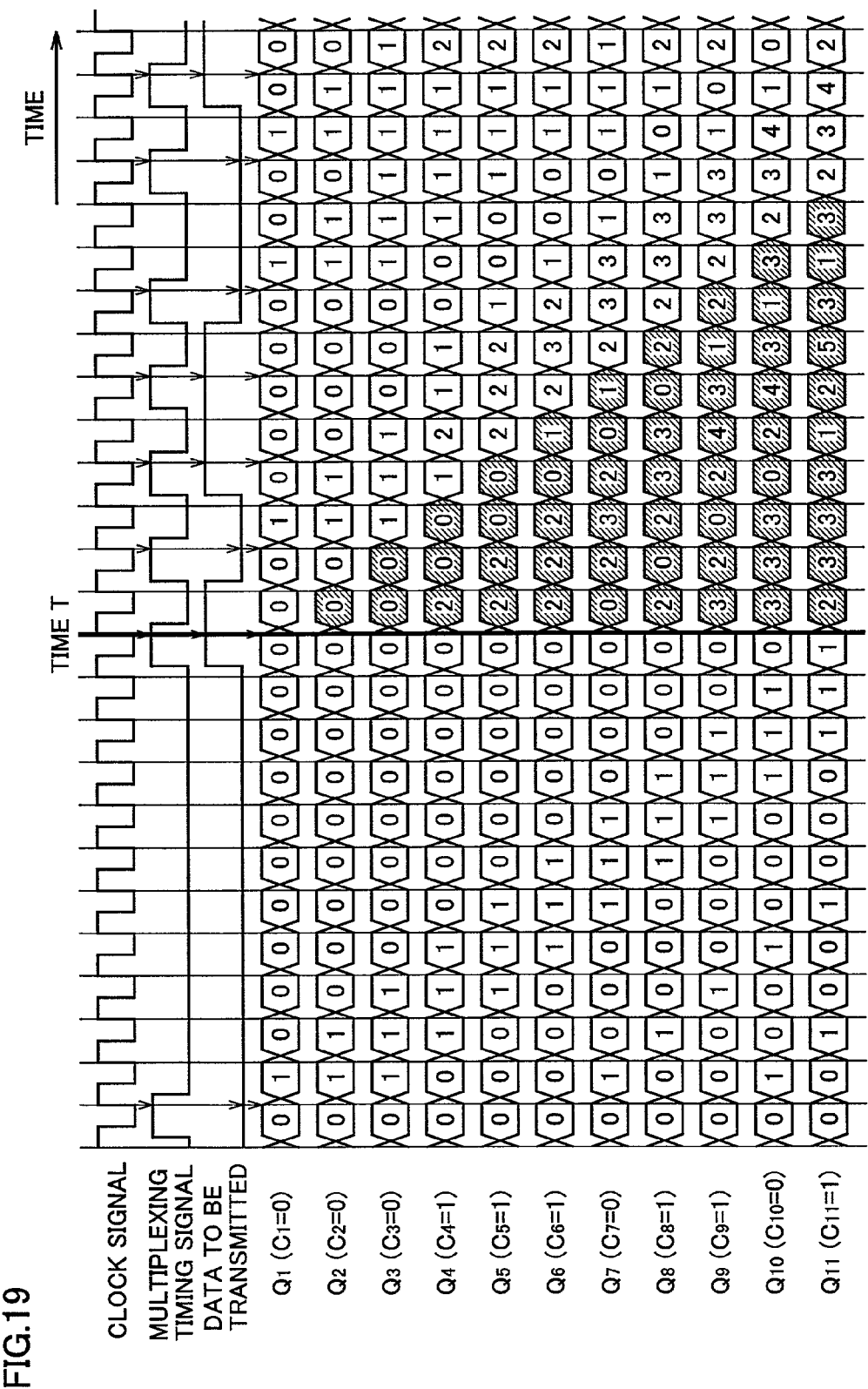
FIG. 19 is an exemplary timing chart of each signal in the FIG. 13 and spreading and multiplexing circuit when a number of signals in multiplexing switches to a different number thereof.

FIG. 19 is a timing chart of each signal when in the FIG. 13 circuit a number of signals in multiplexing is switched to another under the same condition as FIG. 18. In FIG. 19, a number of signals in multiplexing is switched at a timing indicated by time T, the multiplexing timing signal is activated for "1", the offset value is "0", and registers 2(1)–2(11) take in data when a clock signal transitions from low to high. Furthermore, the spreading code sequence is a 11-bit barker code "10110111000", having a top corresponding to spreading code sequence $C_{11}$.

In the FIG. 13 circuit, in response to an initialization signal an initial value is set in each of positive and negative operation units and at a timing of multiplexing-switching, or time T, spread spectrum data to be transmitted and the initial value that are added together are taken in by each of registers 2(1)–2(11). As a result, the FIG. 18 hatched portion of $Q_2$–$Q_{11}$ failing to satisfy a number of signals in multiplexing that is targeted in the switching, has a value with the initial value added thereto, as shown in FIG. 19 at the hatched portion of $Q_2$–$Q_{11}$.

Figure 20:
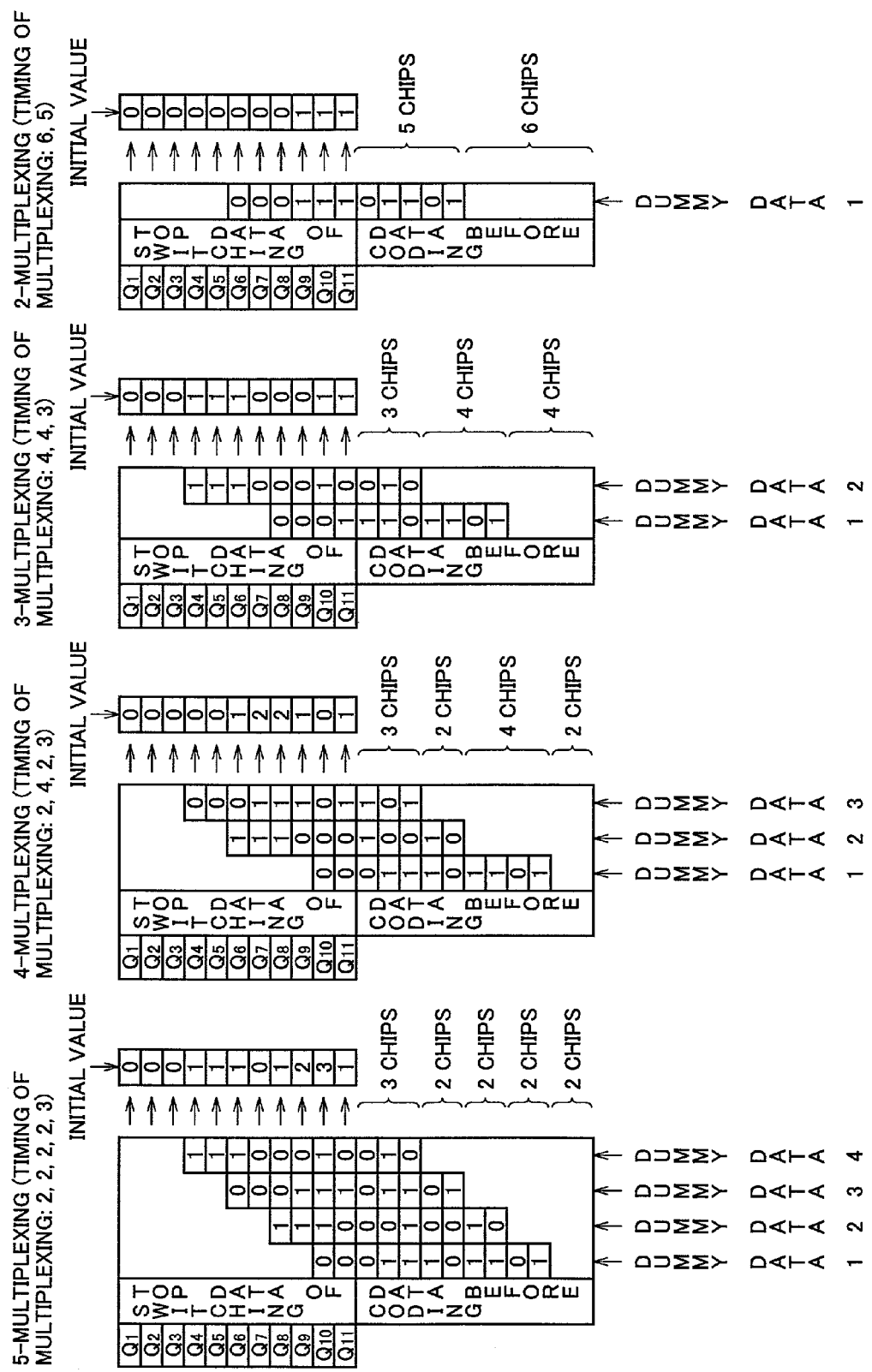
FIG. 20 represents an example of a method of calculating an initial value in the FIG. 13 spreading and multiplexing circuit.

FIG. 20 shows an example of a method of calculating an initial value in the FIG. 13 spreading and multiplexing circuit using a spreading code sequence corresponding to a 11-chip barker code "10110111000" having a top corresponding to a chronologically top chip C11 in transmission.

In FIG. 20, no-multiplexing or an initial status of the circuit is switched to 5-multiplexing with a timing of multiplexing switched by a repetition of a "2 chips, 2 chips, 2 chips, 2 hips, 3 chips" interval, 4-multiplexing similarly with a timing of multiplexing switched by a repetition of a "2, 4, 2, 3" interval, 3-multiplexing similarly with the timing switched by a repetition of a "4, 4, 3" interval, and 2-multiplexeing with the timing switched by a repetition of a "6, 5" interval.

"Data before coding" corresponds to no-multiplexing or the initial status of the circuit, and from "top data in switching" is indicated post switching of multiplexing.

FIG. 20 represents spread data added to each chip when dummy data to be transmitted ("dummy data 1" to maximal "dummy data 4") are spread and multiplexed at respective timings of multiplexing, with an assumption that switching of multiplexing is effected from "data before coding". FIG. 20 shows an example when the dummy data is a repetition of "1" and "0".

Note that the dummy data can have a similar effect in any combination of "1" and "0", including that formed exclusively of 1s and that formed exclusively of 0s. In a result of spreading the spectrum of the dummy data, from an actual timing of multiplexing-switching onwards a stepwise portion overlapping each chip in multiplexing after spreading the spectrum of "top data in switching" is added for each chip to obtain an initial value set for $Q_1$–$Q_{11}$. For the initial value thus obtained, in circuit 14 of each positive and negative operation units a value corresponding to a number of signal in multiplexing and a timing of the multiplexing and a chip location of the operation unit is set in response to an initialization signal.

Figure 21:
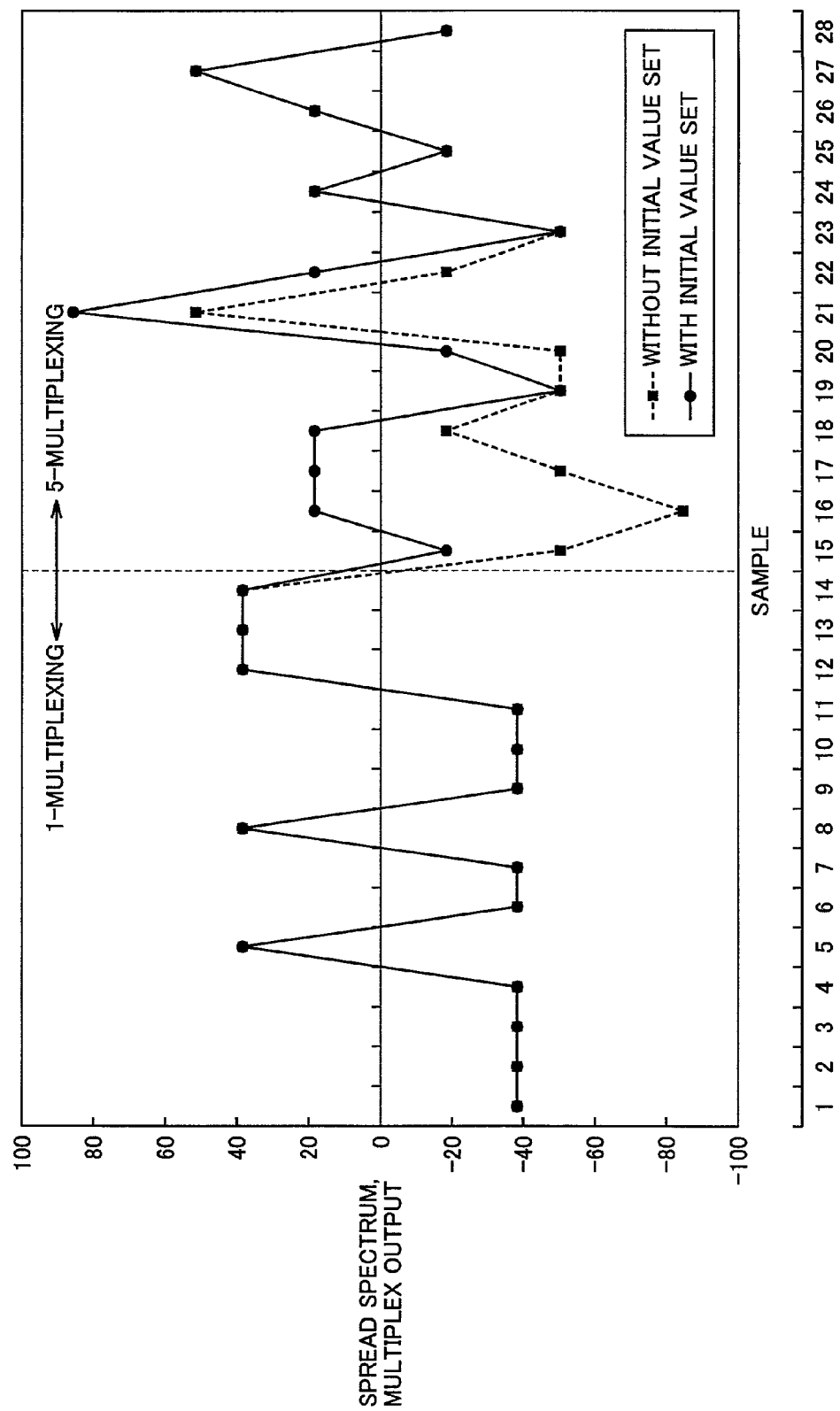
FIG. 21 illustrates a comparison between a spread spectrum and multiplex output with an initial-value setting circuit being provided and without the circuit being provided.

FIG. 21 represents a comparison of a spread spectrum multiplex output with an initial value being set and that without an initial value being set when no-multiplexing is switched to 5-multiplexing with a chip interval for a timing of multiplexing corresponding to a repetition of 2, 2, 2, 2, 3.

As shown in FIG. 21, if an initial value is not set then immediately after switching of multiplexing there is observed a significant drop of the spread spectrum, multiplex output, since, as has been described previously, immediately after switching of multiplexing there exists a chip failing a multiplexing corresponding to a predetermined number of signals in multiplexing. Setting an initial value can reduce the significant drop of the spread spectrum, multiplex output.

Figure 22:
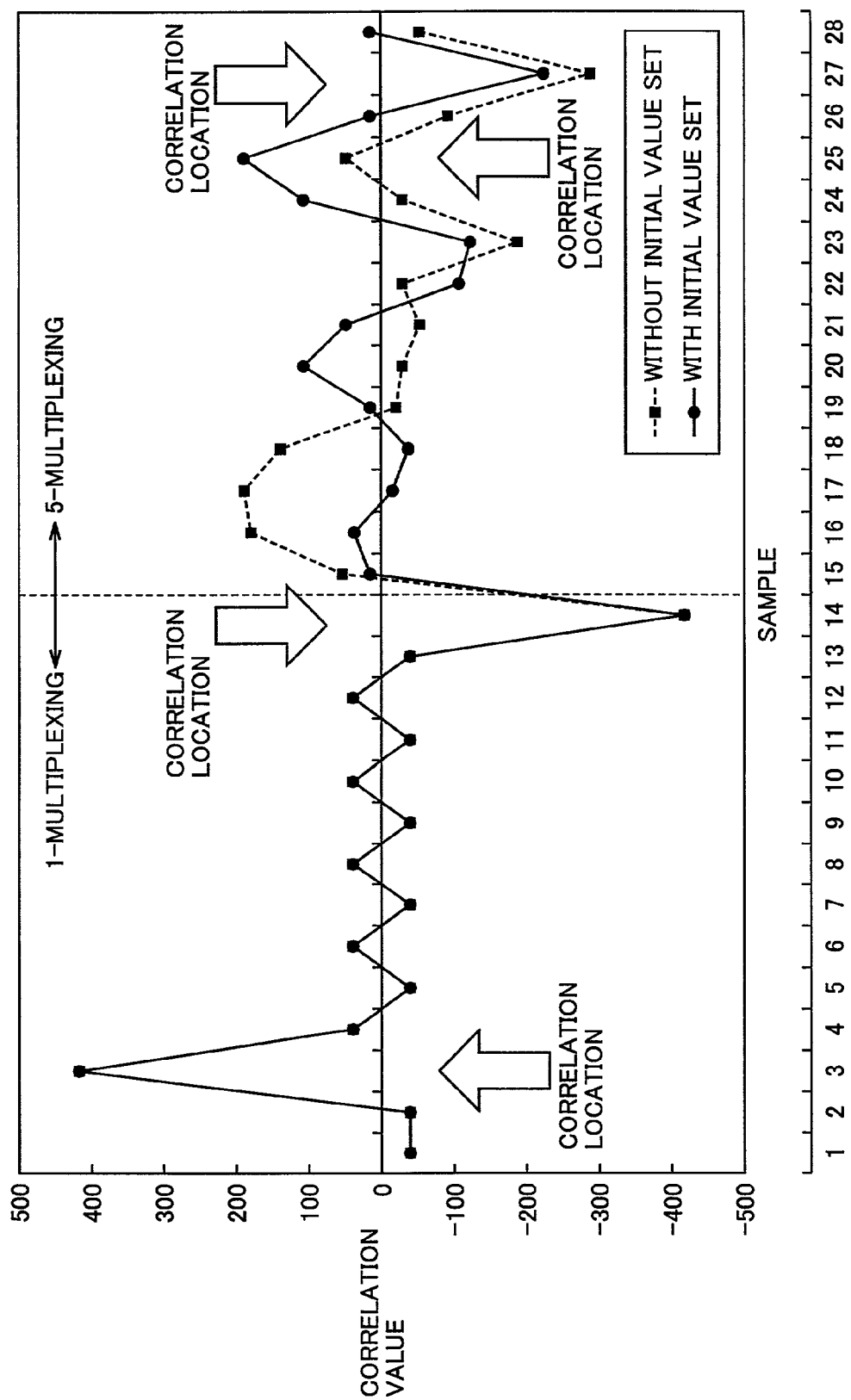
FIG. 22 represents a comparison between a correlation value of a spread spectrum and multiplex output with the initial-value setting circuit being provided and that without the circuit being provided, as shown in FIG. 21.
Figure 23:
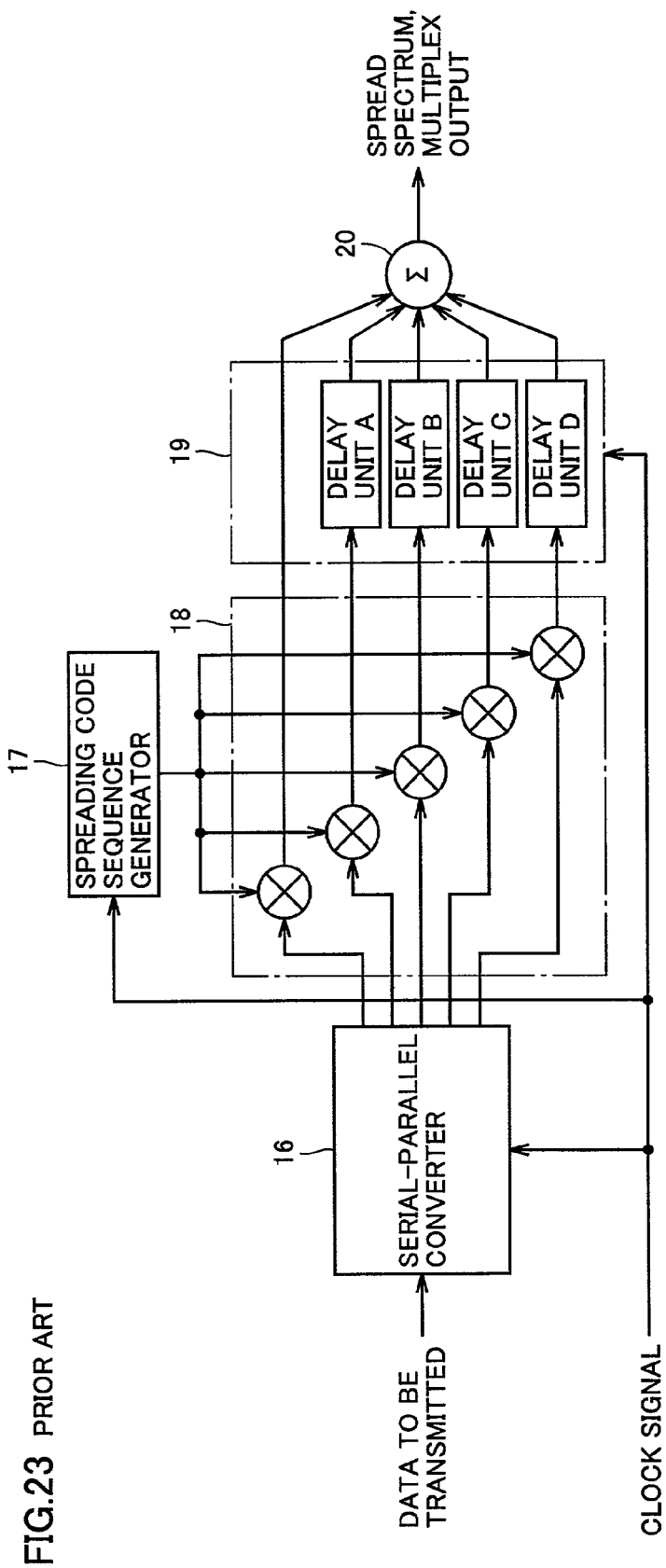
FIG. 23 is a block diagram showing a spreading and multiplexing circuit in a spread spectrum communication transmitter of a first conventional example.
Figure 24:
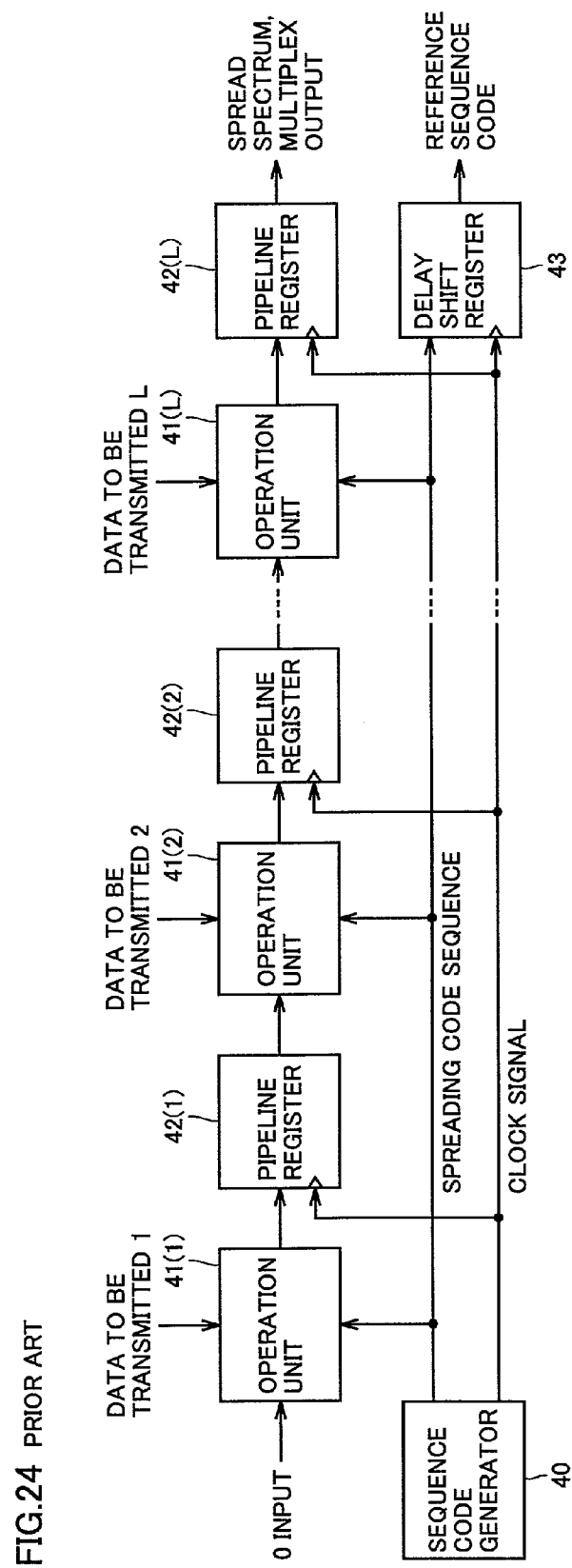
FIG. 24 is a block diagram showing a spreading and multiplexing circuit in a spread spectrum communication transmitter of a second conventional example.

FIG. 22 shows a result of taking a correlation of the FIG. 21 spread spectrum, multiplex output on a recipient side, i.e., a result of de-spreading.

In FIG. 22, an arrow "correlation location" indicates a location of a peak of a correlation expected when the FIG. 21 spread spectrum, multiplex output is appropriately received. As shown in FIG. 22, if an initial value is not set then immediately after a number of signals in multiplexing is switched to another there would appear a peak of a correlation value which should not exist. This peak has approximately the same level in magnitude (or absolute value) as a correlation peak that essentially exist, as appears along the vertical axis at sample points 25 and 27 and it can result in erroneous detection of a correlation location and establishment of a correlation-phasing at an inappropriate point and data can thus be received erroneously. In contrast, if an initial value is set, such a correlation peak as described above does not appear and a correlation location is not erroneously detected nor is correlation-phasing established at an inappropriate point.

INDUSTRIAL APPLICABILITY

A spread spectrum communication transmitter of the present invention is used in a spread spectrum communication system applying a single spread code sequence to all data to be transmitted to obtain spread spectrum data which are in turn delayed by different times $\tau_1$, respectively, and a plurality of such data are added together for each chip corresponding to a minimal unit of the spreading, to multiplex data and thus allow rapid communication.

What is claimed is:

1. A spread spectrum communication transmitter applying a single spreading code sequence to all data to be transmitted, to provide spread spectrum data, delaying each of said spread spectrum data by a different time to provide delayed, spread spectrum data, and adding said delayed, spread spectrum data together for each chip corresponding to a minimal spreading unit, to provide multiplex data, comprising:

a multiplexing timing signal generator for generating a multiplexing timing signal activated for each interval corresponding to a number of chips delayed in multiplexing between data to be transmitted;

a plurality of registers each corresponding to a chip of said spreading code sequence and taking in input data holding a number of chips each corresponding to a result of spectrum-spreading and thus multiplexing at least one data to be transmitted, said number corresponding to a length of said spreading code sequence, said register taking in said input data in response to a clock signal equal to a chip rate corresponding to a rate applied to transmit each spread spectrum chip; and a plurality of operation mechanisms each including an operation unit paired with said register and corresponding to a chip of said spreading code sequence, receiving a value of a chip of said spreading code sequence corresponding to said operation unit and identical data to be transmitted, any subsequent one of said operation unit each receiving a value of an output of an immediately preceding register and simultaneously obtaining a chip corresponding to a result of spreading a spectrum of data to be transmitted, with a corresponding chip of said spreading code sequence, when said multiplexing timing signal output from said multiplexing timing signal generator is active, an initial one of said operation unit imputing to said paired register said result of spreading, any other operation unit imputing to said paired register said result of spreading plus the value of said immediately preceding register, when said multiplexing timing signal is inactive said initial operation unit inputting a numerical value of zero to said paired register and said any other operation unit inputting the value of said immediately preceding register to said paired register.

2. A spread spectrum communication transmitter applying a single spreading code sequence to all data to be transmitted, to provide spread spectrum data, delaying each of said spread spectrum data by a different time to provide delayed, spread spectrum data, and adding said delayed, spread spectrum data together for each chip corresponding to a minimal spreading unit, to provide multiplex data, comprising:

a multiplexing timing signal generator for generating a multiplexing timing signal activated for each interval corresponding to a number of chips delayed in multiplexing between data to be transmitted;

a plurality of registers each corresponding to a chip of said spreading code sequence, holding a number of chips each corresponding to a result of spectrum-spreading and thus multiplexing at least one data to be transmitted, said number corresponding to a length of said spreading code sequence, said register taking in input data in response to a clock signal equal to a chip rate corresponding to a rate applied to transmit each spread spectrum chip; and a plurality of operation mechanisms each including an operation unit paired with said register and corresponding to a chip of said spreading code sequence, receiving a value of a chip of said spreading code sequence corresponding to said operation unit and identical data to be transmitted, any subsequent one of said operation unit each receiving a value of an output of an immediately preceding register, an initial one of said operation unit receiving a predetermined offset value, said operation unit simultaneously obtaining a chip corresponding to a result of spreading a spectrum of data to be transmitted, with a corresponding chip of said spreading code sequence, when said multiplexing timing signal output from said multiplexing timing signal generator is active, said initial operation unit imputing to said paired register said result of spreading plus said offset value, any other operation unit imputing to said paired register said result of spreading plus the value of said immediately preceding register, when said multiplexing timing signal is inactive said initial operation unit inputting said offset value to said paired register and said any other operation unit inputting the value of said immediately preceding register to said paired register.

3. The transmitter of claim 2, wherein said operation mechanism includes:
   an adder for adding one of positive and negative constants arbitrarily determined and shared by each chip, to said offset value for said initial operation unit and to the value of said immediately preceding register for said any other operation unit;
   a first logic operator outputting a first logic signal serving as a result of a multiplication of an identical sign based on a fact that data to be transmitted is equal in value to a corresponding spreading code sequence, and outputting a second logic signal serving as a result of a multiplication of a different sign based on a fact that data to be transmitted is different in value from a corresponding spreading code sequence;
   a second logic operator deriving an output of said first logic operator when said multiplexing timing signal is active, and outputting said second logic signal when said multiplexing timing signal is inactive; and
   a selector for selecting an output of said adder when said second logic operator outputs a first logic, and selecting said offset value for said initial operation unit and the output of said immediately preceding register for said any other operation unit when said second logic operator outputs a second logic.

4. The transmitter of claim 2, wherein:
   a constant is a first logic; and
   said operation mechanism includes
      a first logic mechanism outputting a first logic signal serving as a result of a multiplication of an identical sign based on a fact that data to be transmitted is equal in value to a corresponding spreading code sequence, and outputting a second logic signal serving as a result of a multiplication of a different sign based on a fact that data to be transmitted is different in value from a corresponding spreading code sequence;
      a second logic operator deriving an output of said first logic operator when said multiplexing timing signal is active, and outputting said second logic signal when said multiplexing timing signal is inactive; and
      an adder for adding an output of said second logic operator to said offset value for said initial operation unit and to the value of said immediately preceding register for said any other operation unit.

5. The transmitter of claim 2, wherein said operation mechanism includes:
   a positive operation unit having an initial operation unit and a subsequent operation unit, for a corresponding spreading code sequence chip having a first logic when said multiplexing timing signal is active at a timing of a clock said initial operation unit adding said offset value and data to be transmitted together and said subsequent operation unit adding a value of a corresponding, immediately preceding register and data to be transmitted together and when said multiplexing timing signal is inactive at the timing of the clock said initial operation unit inputting said offset value to a corresponding register and said subsequent operation unit inputting the value of said immediately preceding register to a corresponding register; and
   a negative operation unit having an initial operation unit and a subsequent operation unit, for a corresponding spreading code sequence chip of a second logic when said multiplexing timing signal is active at a timing of a clock said initial operation unit adding said offset value and data to be transmitted together and said subsequent operation unit adding a value of an immediately preceding register and an inverted version of said data to be transmitted together and when said multiplexing timing signal is inactive at the timing of the clock said initial operation unit outputting said offset value and said subsequent operation unit outputting the value of said immediately preceding register.

6. The transmitter of claim 5, wherein said positive operation unit has:
   an adder adding together said offset value and one of positive and negative constants arbitrarily determined and shared by each chip, for said initial, positive operation unit;
   a logic operation unit driven by said multiplexing timing signal being active, to output said data to be transmitted, and driven by said multiplexing timing signal being inactive, to output a second logic signal; and
   a selector driven by an output of said logic operation unit of a first logic to derive an output of said adder, and driven by the output of said logic operation unit of a second logic to select one of said offset value and the output of said immediately preceding register.

7. The transmitter of claim 5, wherein said negative operation unit has:
   an adder gadding together said offset value and one of positive and negative constants arbitrarily determined and shared by each chip, for said initial, negative operation unit;
   a sign inverter inverting a sign of said data to be transmitted;
   a logic operator deriving an output of said sign inverter when said multiplexing timing signal is active, and to outputting a second logic value when said multiplexing timing signal is inactive; and
   a selector driven by an output of said logic operator of a first logic value to select an output of said adder and driven by the output of said logic operator of a second logic value to select one of said offset value and the output of said register.

8. The transmitter of claim 5, wherein:
   a constant has a first logic value; and
   said positive operation unit has
      a logic operation unit outputting data to be transmitted when said multiplexing timing signal is active, and outputting a second logic value when said multiplexing timing signal is inactive, and
      an adder adding an output of said logic operation unit to said offset value for said initial operation unit.

9. The transmitter of claim 5, wherein:
   a constant has a first logic value; and
   said negative operation unit has
      a sign inverter for inverting a sign of said data to be transmitted, a logic operation unit deriving an output of said sign inverter when said multiplexing timing signal is active, and outputting a second logic value when said multiplexing timing signal is inactive, and an adder for adding an output of said logic operation unit to said offset value for said initial operation unit and adding an output of said logic operation unit to a value of a corresponding, immediately preceding register for any other operation unit.

10. The transmitter of claim 2, wherein:

when in said spreading code sequence a chip corresponding to said initial operation unit has a first logic value said initial operation unit is driven by said multiplexing timing signal being active, to output data to be transmitted, and driven by said multiplexing timing signal being inactive, to output a second logic value; and when in said spreading code sequence a chip corresponding to said initial operation unit has a second logic value said initial operation unit is driven by said multiplexing timing signal being active, to invert a logic of said data to be transmitted, for output, and driven by said multiplexing timing signal being inactive, to output a second logic value.

11. The transmitter of claim 2, further comprising an initial-value setter for setting an initial value in each resister at at least one of a timing of starting a transmission operation and a timing of multiplexing-switching, said initial value being determined for each register from a location of a corresponding chip of a spreading code sequence and a number of signals in multiplexing and a pattern of a timing of the multiplexing.

12. The transmitter of claim 11, wherein said initial-value setter receives one of a timing signal provided at at least one of a time of starting said transmission operation and that of multiplexing-switching, and an initialization signal indicative of information of a number of signals in multiplexing and a pattern of the multiplexing, an initial operation unit receiving said offset value and any other operation unit adding together a value of an immediately preceding register and an initial value predetermined for a location of each chip of said spreading code sequence at a timing indicated by said initialization signal, to allow said initial-value setter to set an initial value.

13. The transmitter of claim 12, wherein on an assumption that since at least a number of clocks prior to a timing of said set initial value spectrum-spreading and thus multiplexing data to be transmitted initially after said transmission operation starts or said multiplexing switches, said number corresponding to a number of chips of a spreading code sequence, data to be transmitted has been continuously spectrum-spread and thus multiplexed by a pattern identical to a timing of multiplexing after said transmission operation started or the multiplexing switched, when virtual data to be transmitted serving as dummy data are all dummy data of one of a first logic and a second logic and a combination of said first and second logics and subsequent to a result of spectrum-spreading and thus multiplexing said dummy data a result of spectrum-spreading said initial data to be transmitted is to be multiplexed said initial-value setter applies a value of a result of spectrum-spreading and thus multiplexing dummy data located in a portion overlapping therebetween at each chip location.

14. The transmitter of claim 2, wherein said multiplexing timing signal generator includes:

a counter initialized by a start signal to count a clock signal, with a period corresponding to a chip length of said spreading code sequence;

a decoder for decoding an output of said counter; and a timing generator driven by an output of said decoder to generate a multiplexing timing signal based on a multiplexing parameter and activated at a predetermined timing.

15. The transmitter of claim 2, further comprising an amplitude converter using a multiplexing parameter to convert a value of a result of spectrum-spreading and thus multiplexing an output of said operation mechanism, for outputting a spread-spectrum, multiplex signal.

\* \* \* \* \*